(12) United States Patent
Murthy et al.

(10) Patent No.: US 8,861,935 B2
(45) Date of Patent: Oct. 14, 2014

(54) SYSTEMS AND METHODS FOR ENHANCING UTILIZATION OF RECORDED MEDIA CONTENT PROGRAMS

(75) Inventors: Sudhindra S. Murthy, Irving, TX (US); Lakshmi Chakarapani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 539 days.

(21) Appl. No.: 12/547,720

(22) Filed: Aug. 26, 2009

(65) Prior Publication Data

US 2011/0052146 A1 Mar. 3, 2011

(51) Int. Cl.
*G11B 27/00* (2006.01)
*H04N 5/93* (2006.01)

(52) U.S. Cl.
USPC ........... 386/290; 386/278; 386/281; 386/282; 386/286

(58) Field of Classification Search
USPC .......................... 386/278, 281, 282, 286, 290
See application file for complete search history.

(56) References Cited

U.S. PATENT DOCUMENTS

| | | | |
|---|---|---|---|
| 6,307,550 B1 * | 10/2001 | Chen et al. ..................... 345/418 |
| 6,535,639 B1 * | 3/2003 | Uchihachi et al. ............ 382/225 |
| 6,670,934 B1 * | 12/2003 | Muoio et al. ................... 345/1.1 |
| 7,313,808 B1 * | 12/2007 | Gupta et al. ..................... 725/89 |
| 7,603,682 B1 * | 10/2009 | Akiyama et al. .................. 725/9 |
| 7,890,867 B1 * | 2/2011 | Margulis ....................... 715/723 |
| 2003/0033502 A1 * | 2/2003 | Matsuzaki .................... 712/200 |
| 2008/0193099 A1 * | 8/2008 | Nakai et al. ..................... 386/52 |
| 2009/0132071 A1 * | 5/2009 | Phillip ............................. 700/91 |

* cited by examiner

*Primary Examiner* — Daquan Zhao

(57) ABSTRACT

Exemplary systems and methods for enhancing utilization of recorded media content programs are disclosed. An exemplary method includes a media content processing system maintaining data representative of a recorded media content program in a data storage facility, accessing program highlights data for the recorded media content program, the program highlights data specifying a set of one or more select segments of the recorded media content program, and utilizing the program highlights data to access and play back the set of one or more select segments of the recorded media content program for experiencing by a user. In some examples, the end user has control of selection and playback of the set of one or more select segments of the recorded media content program. Corresponding systems and methods are also disclosed.

25 Claims, 22 Drawing Sheets

| Index of Start Offset | Index of End Offset | Duration |
|---|---|---|
| 750 | 878 | 128 |
| 1675 | 1925 | 250 |
| 3300 | 3400 | 100 |

SYSTEMS AND METHODS FOR ENHANCING UTILIZATION OF RECORDED MEDIA CONTENT PROGRAMS

BACKGROUND INFORMATION

The set-top box has become an important device for accessing media content services and the media content within those services. It is not uncommon for a set-top box to include or to be used in conjunction with digital video recording ("DVR") technology, which may be used to record media content to permanent storage (e.g., a hard disk) for subsequent local access.

With conventional technologies, once media content is recorded to permanent storage, options for utilizing the recorded media content are limited. Typically, a user is able to access and play back media content. Additionally, one or more trick-play modes may be provided to allow a user to manually fast forward, rewind, and skip through recorded media content. However, there remains room to provide enhanced functionality and options for utilization of recorded media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 illustrates a table of exemplary indexing data corresponding to the set of select segments of the recorded media content program shown in FIG. 5.

DETAILED DESCRIPTION OF PREFERRED EMBODIMENTS

Figure 1:
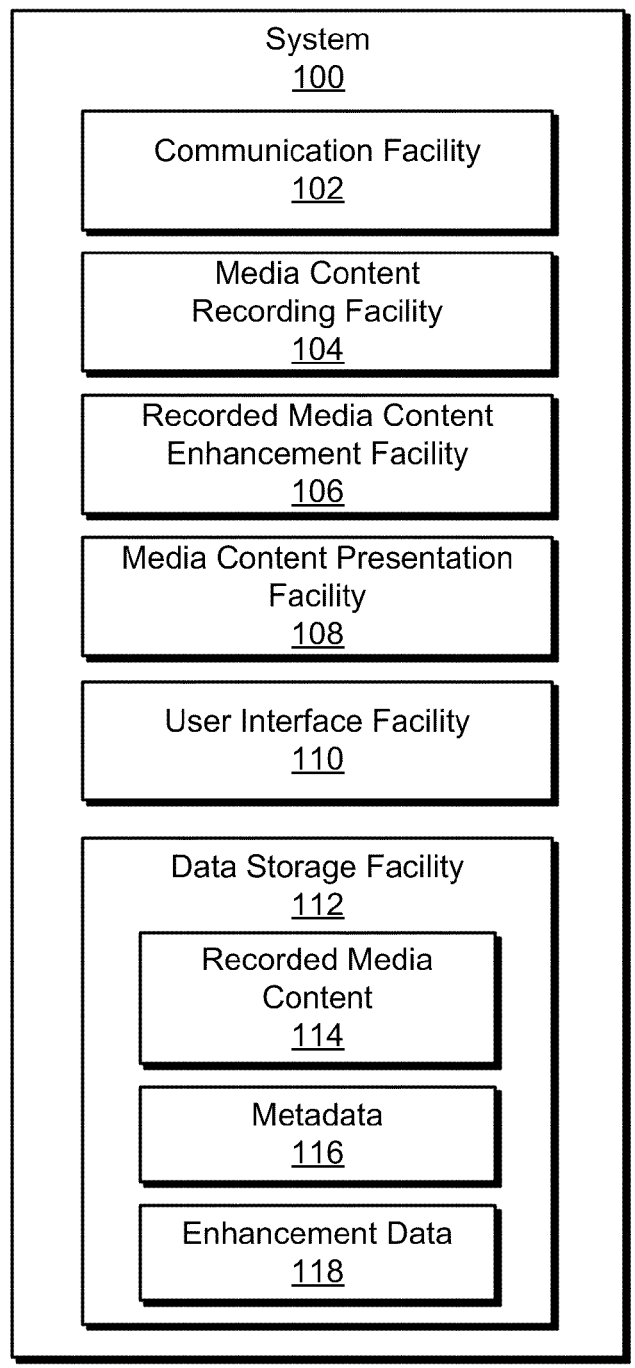
FIG. 1 illustrates an exemplary system for enhancing utilization of recorded media content.

Exemplary systems and methods for enhancing utilization of recorded media content are described herein. As described in more detail below, the systems and methods may provide enhanced functionality and/or options for utilization of recorded media content.

As an example, media content program highlights data specifying a set of one or more select segments of a recorded media content program may be provided and used to access and play back the set of one or more select segments of the recorded media content program for experiencing by a user. The set of one or more select segments of the recorded media content program may represent a set of one or more select highlights in the recorded media content program. The program highlights data may be defined by and accessed from any suitable source such as a producer or distributor of the media content program, or from a third-party providing a media content program highlights server. For instance, a content producer of a televised sports event (e.g., an American football game) may provide program highlights data defining a set of select highlights in the sports event, such as a set of exceptional plays, bloopers, turning points, and/or other highlight moments within the sports event. The program highlights data for the sports event may be utilized to access and play back the set of highlights in the sports event. Accordingly, instead of a user watching the entire recorded sports event, the program highlights data may allow the user to watch only the set of highlights of the sports event, as defined by the program highlights data, without having to manually use trick-play modes to fast forward and/or skip through the full recording of the sports event.

In certain embodiments, an end user (e.g., a subscriber to a service) may provide program highlights data by defining a custom playlist set of one or more select highlights for a recorded media content program. In certain embodiments, one or more tools may be provided to facilitate a user definition of a playlist set of highlights (e.g., a custom playlist of user-selected clips) in a recorded media content program. Examples of such tools are described in detail further below.

As another example of enhanced functionality and/or options for utilization of recorded media content, viewership ratings for recorded media content may be updated such that up-to-date viewership ratings may be accessed and associated with recorded media content. Accordingly, a viewership rating that is initially associated with a recorded media content program when the media content program is recorded is not static. Inasmuch as the viewership rating for the media content program may change after the media content program has been recorded, data representative of the viewership rating associated with the media content program may be updated to reflect such a change. Accordingly, an end-user media content processing device may be able to access and utilize an updated viewership rating for a recorded media content program.

As used herein, the term "media content" may refer generally to any content that may be accessed, recorded, and/or presented by a media content access subsystem for experiencing by a user of the media content access subsystem. The term "media content program" as used herein may refer generally to any television program, on-demand media program, pay-per-view media program, broadcast media program (e.g., broadcast television program), multicast media program, narrowcast media program, IPTV program, video program, streamed media program, or any other form of video, audio, or audiovisual content that may be accessed and/or presented by the media content access subsystem for experiencing by a user.

The term "recorded media content program" as used herein may refer generally to any media content program recorded or otherwise stored to a data storage device such as a data storage device within or otherwise accessible to a digital video recorder ("DVR") device, a network video recorder, a set-top box, personal media player, or another media content processing device. In certain embodiments, a recorded media content program includes a recorded live transmission (e.g., a broadcast, multicast, or narrowcast transmission) of a media content program. The term "live transmission" as used herein may refer generally to a streaming of media content over a network to at least one media content processing device in a manner that enables the media content processing device to begin presenting (e.g., playing back) a media content program carried by the live transmission without having to first download the entire media content program. For example, a broadcast, multicast, or narrowcast television program may be streamed to an end-user media content processing device in a live transmission and presented by the end-user media content processing device for experiencing by an end user while the broadcast, multicast, or narrowcast is in process.

Exemplary systems and methods for enhancing utilization of recorded media content will now be described with reference to the accompanying drawings.

FIG. 1 illustrates an exemplary media content processing system 100 (or simply "system 100") for enhancing utilization of recorded media content. While an exemplary system 100 is shown in FIG. 1, the components and configuration of system 100 illustrated in FIG. 1 are not intended to be limiting. Additional or alternative components and/or configurations may be used in other embodiments. In certain alternative embodiments, for example, one or more of the components shown in FIG. 1 may be omitted or combined.

System 100 may include, but is not limited to, a communication facility 102, a media content recording facility 104, a recorded media content enhancement facility 106, a media content presentation facility 108, a user interface facility 110, and a data storage facility 112 selectively and communicatively coupled one to another. Any suitable communication technologies, including any of the communication technologies mentioned herein, may be employed to facilitate communications between facilities 102-112.

Communication facility 102 may be configured to communicate with one or more computing devices. In particular, communication facility 102 may be configured to transmit and/or receive communication signals, media content, and/or data to/from a media content provider device and/or a program highlights data source device. Examples of communication facility 102 include, without limitation, a wired network interface (such as a network interface card), a wireless network interface (such as a wireless network interface card), a modem, an optical fiber network terminal, and any other suitable interface.

Media content recording facility 104 may be configured to record data representative of media content to a data storage facility such as data storage facility 112. Recorded media content 114 represents data representative of media content that has been recorded to data storage facility 112 by media content recording facility 104. The recording of a media content program is typically performed when data representative of a transmission of the media content program is received from a media content provider device. For example, during transmission of a media content program from a provider device on a media content carrier channel, communication facility 102 may receive data representative of the media content program on the media content carrier channel, and media content recording facility 104 may direct that the received data representative of the media content program be stored to data storage facility 112. Once stored, the data representative the media content program may be accessed and processed as may suit a particular application, including in any of the exemplary ways described herein.

Recorded media content enhancement facility 106 (or simply "enhancement facility 106") may be configured to provide one or more enhanced functions and/or options for utilizing recorded media content such as recorded media content 114 stored in data storage facility 112. Examples of such functions and options are described in detail further below. Enhancement facility 106 may be configured to interact with one or more of the other facilities shown in FIG. 1 to provide enhanced functions and/or options for utilizing recorded media content.

Media content presentation facility 108 (or simply "presentation facility 108") may be configured to present media content for experiencing by a user. A presentation of media content may be performed in any suitable way such as generating and/or providing output signals representative of media content to a display device and/or a audio output device. For example, presentation facility 108 may play back a media content program for experiencing by a user.

User interface facility 110 may be configured to provide one or more user interfaces configured to facilitate user interaction with system 100. For example, user interface facility 110 may provide a user interface through which one or more functions, options, features, and/or tools may be provided to a user than through which user input may be received. Exemplary graphical user interfaces that may be provided by user interface facility 110 are described in detail further below.

Data storage facility 112 may be configured to maintain recorded media content 114, metadata 116, enhancement data 118, and any other data as may serve a particular application. As mentioned, recorded media content 114 may include data representative of media content (e.g., one or more media content programs) that has been recorded by media content recording facility 104 or otherwise stored to data storage facility 112. Metadata 116 may include any data descriptive of or otherwise associated with recorded media content 114. For example, metadata 116 may include program identifiers, titles, descriptions, genre descriptors, actor/actress information, etc. associated with recorded media content 114. Enhancement data 118 may include any data used to provide one or more enhanced functions and/or options for utilization of recorded media content. For example, as described in detail further below, enhancement data 118 may include program highlights data specifying one or more select segments of a media content program, indexing data for indexing a recorded media content program, and viewership ratings data specifying a viewership rating for a media content program. In certain embodiments, enhancement data 118 may be integrated within metadata 116. For example, metadata 116 may include one or more data fields (e.g., a program highlights data field and a viewership ratings field) dedicated to enhancement data 118 and/or links to enhancement data 118.

System 100, including facilities 102-112, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 2:
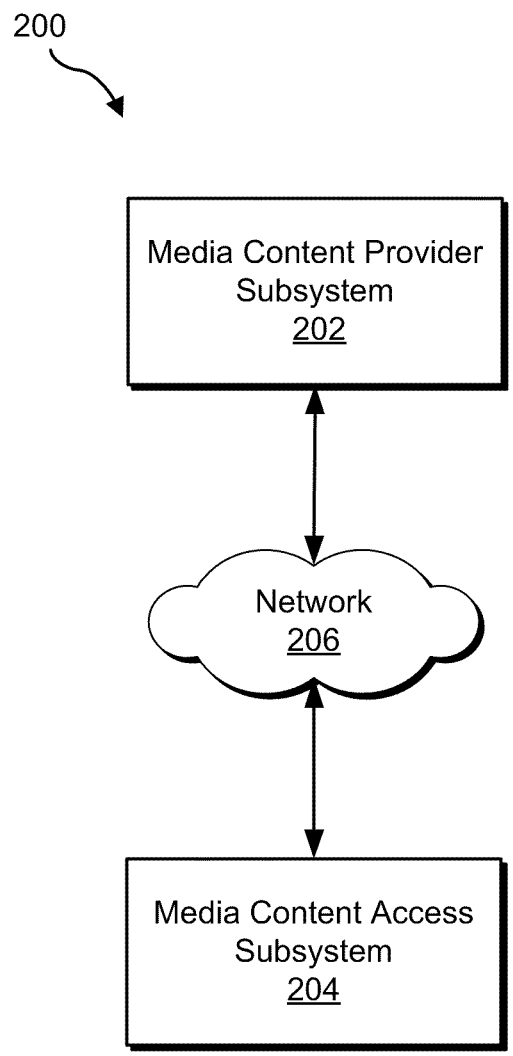
FIG. 2 illustrates an exemplary implementation of the system of FIG. 1.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, communication facility 102, media content recording facility 104, enhancement facility 106, media content presentation facility 108, user interface facility 110, and data storage facility 112 may each be implemented on one or both of provider subsystem 202 and access subsystem 204.

Access subsystem 204 may be configured to communicate with and receive a signal and/or data stream containing data representative of media content and/or data associated with media content (e.g., metadata, program guide data, etc.) from provider subsystem 202. Access subsystem 204 and provider subsystem 202 may communicate using any suitable communication technologies, devices, networks, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection). Moreover, it will be recognized that in some examples, system 100 may be entirely implemented on access subsystem 204 or provider subsystem 202, or distributed across access subsystem 204 and provider subsystem 202.

In some examples, provider subsystem 202 may be configured to generate or otherwise provide media content (e.g., in the form of one or more media content streams such as broadcast, multicast, and/or narrowcast media content streams) to access subsystem 204. Access subsystem 204 may be configured to facilitate access by an end user to media content received from provider subsystem 202. To this end, access subsystem 204 may access and present the media content for experiencing (e.g., viewing) by an end user, record the media content, parse metadata and/or other data associated with the media content, etc. Presentation of the media content may include, but is not limited to, displaying, playing back, streaming, or otherwise presenting the media content, or one or more components and/or segments of the media content, such that the media content may be experienced by the user.

In certain embodiments, media content access subsystem 204 may include one or more media content processing devices such as a set-top box, DVR device, and media content output device (e.g., a display device and/or an audio output device) configured to receive media content from provider subsystem 202 via network 206, which may include a subscriber television network. In such embodiments, provider subsystem 202 may include one or more server devices (e.g., application servers and/or content servers), video hub office equipment, transmission devices, and/or transceivers configured to transmit data representative of media content and/or other data over network 206.

Figure 3:
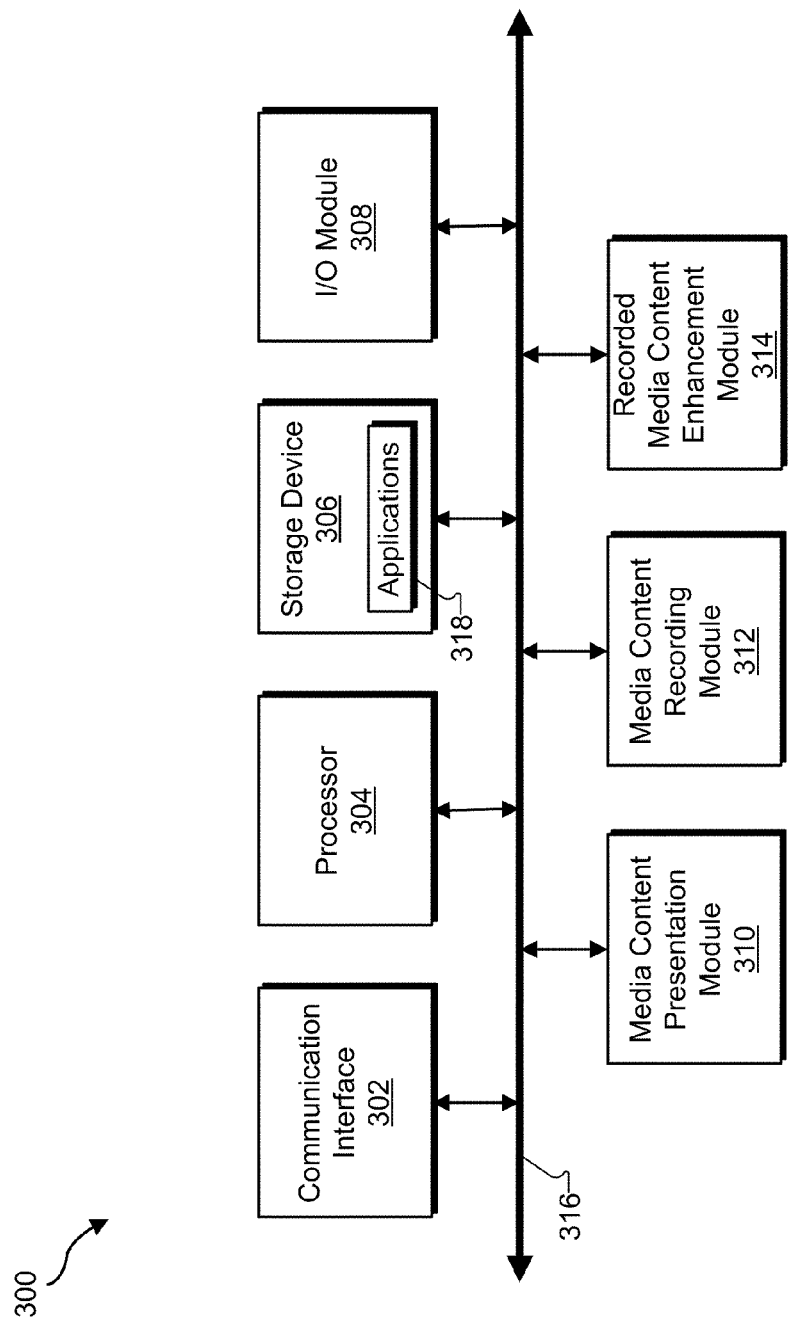
FIG. 3 illustrates an exemplary device for enhancing utilization of recorded media content.

FIG. 3 illustrates an exemplary media content processing device 300 (or simply "device 300"). One or more components of system 100 may be implemented by or on device 300. Additionally or alternatively, provider subsystem 202 or access subsystem 204 may include or be implemented by device 300. As shown in FIG. 3, device 300 may include a communication interface 302, a processor 304, a storage device 306, an input/output ("I/O") module 308, a media content presentation module 310, a media content recording module 312, and a recorded media content enhancement module 314 (or simply "enhancement module 314") communicatively coupled one to another via a communication infrastructure 316. The components of device 300 may communicate with one another, including sending data to and receiving data from one another, using any suitable communication technologies. Moreover, the components of device 300 may be implemented on any computing device or combination of computing devices configured to process media content, such as a set-top box, a mobile device (e.g., a mobile phone device), a personal computer, a phone device (e.g., Verizon Hub device), a personal-digital assistant device, a gaming device, a DVR device (e.g., a personal video recording ("PVR") device), a television device, a personal media player device, and/or any media content processing device configured to perform one or more of the processes and/or operations described herein.

While an exemplary device 300 is shown in FIG. 3, the components illustrated in FIG. 3 are not intended to be limiting. Additional or alternative components may be used in other embodiments. Components of the device 300 shown in FIG. 3 will now be described in additional detail.

Communication interface 302 may be configured to communicate with one or more computing devices. In particular, communication interface 302 may be configured to transmit and/or receive communication signals, media content, and/or data to/from a media content provider device and/or a program highlights data source device. Examples of communication interface 302 include, without limitation, a wired network interface (such as a network interface card), a wireless network interface (such as a wireless network interface card), a modem, an optical fiber network terminal, and any other suitable interface.

In some examples, communication interface 302 may be configured to selectively identify, receive, transmit, and/or process appropriate data streams and/or media content programs at scheduled transmission times and on appropriate media content carrier channels. For instance, in certain implementations communication interface 302 may include a tuner configured to selectively receive media content carried on a particular media content carrier channel. The tuner may be tuned to a particular media content carrier channel such that the media content carried on the media content carrier channel is received and may be processed by device 300.

In some examples, communication interface 302 may include multiple tuners such that media content carried on different media content carrier channels may be concurrently received for processing by the device 300. For example, communication interface 302 may include a first tuner configured to receive media content carried on an analog video signal and a second tuner configured to concurrently receive media content carried on a digital compressed signal.

While one or more tuners may be used to receive various types of media content-carrying signals, additionally or alternatively, communication interface 302 may be configured to receive other types of signals (e.g., other types of media content carrying signals) from one or more other media content sources without using a tuner. For example, provider subsystem 202 may transmit digital streams of data packets (e.g., Internet Protocol ("IP") based data packets) that can be received without using a tuner. For such types of signals, communication interface 302 may receive and forward the signals directly to other components of device 300 without the signals going through a tuner. For an IP-based signal, for example, communication interface 302 may function as an IP receiver.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 318 or other computer-executable instructions such as may be stored in storage device 306 or another computer-readable medium. As an example, processor 304 may be configured to process data, including demodulating, decoding, and/or parsing data (e.g., data representative of media content received by communication interface 302), and encoding and modulating data for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 318 configured to direct processor 304 to perform any of the operations described herein may be stored within storage device 306. In some examples, data may be arranged in one or more databases residing within storage device 306.

I/O module 308 may be configured to receive user input and provide user output and may include any hardware, firmware, software, or combination thereof supportive of input and output capabilities. For example, I/O module 308 may include one or more devices for capturing user input, including, but not limited to, a microphone, a keyboard or keypad, a touch screen component (e.g., touch screen display), a receiver (e.g., an RF or infrared receiver), and/or one or more input buttons.

I/O module 308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 308 is configured to provide graphical data to a display for presentation to a user. The graphical data may be representative of one or more graphical user interfaces ("GUIs"), GUI views, media content views, and/or any other view as may serve a particular application.

Media content presentation module 310 may be configured to present media content for experiencing by a user of device 300. A presentation of media content may be performed in any suitable way such as generating and/or providing output signals representative of media content to I/O module 308 for output to a user and/or to a presentation device such as a display device and/or a audio output device. For example, presentation module 310 may generate and provide signals to play back a media content program for experiencing by a user of device 300.

Media content recording module 312 may be configured to record data representative of media content to storage device 306. The recording of a media content program is typically performed when data representative of a transmission of the media content program is received by communication interface 302. For example, during transmission of a media content program from a provider device on a media content carrier channel, communication interface 302 may receive data representative of the media content program on the media content carrier channel, and media content recording module 312 may direct that the received data representative of the media content program be stored to storage device 306. Once stored, the data representative the media content program may be accessed and processed as may suit a particular application, including in any of the exemplary ways described herein.

Enhancement module 314 may be configured to provide and/or direct performance of one or more enhanced functions and/or options for utilizing recorded media content such as one or more recorded media content programs stored in storage device 306. Examples of such functions and options are described in detail further below.

In some examples, communication facility 102, media content recording facility 104, enhancement facility 106, media content presentation facility 108, user interface facility 110, and data storage facility 112 of system 100 shown in FIG. 1 may be implemented by or within one or more components of device 300. For example, one or more applications 318 residing within storage device 306 may be configured to direct processor 304 to perform one or more processes or functions associated with communication facility 102, media content recording facility 104, enhancement facility 106, media content presentation facility 108, and/or user interface facility 110. Likewise, storage facility 112 may be implemented by or within storage device 306. For example, recorded media content 114, metadata 116, and enhancement data 118 may be stored within storage device 306.

Device 300 may include an end-user media content processing device or a network media content processing device. For example, device 300 may include an end-user set-top box and/or DVR device. Alternatively, device 300 may include a network media content recording device configured to provide a network-based media content recording service to an end-user media content processing device via a network.

Exemplary enhanced functions and/or options for utilization of recorded media content will now be described. One or more of the exemplary functions and/or options may be performed and/or provided by system 100, provider subsystem 202, access subsystem 204, and/or device 300.

Figure 4:
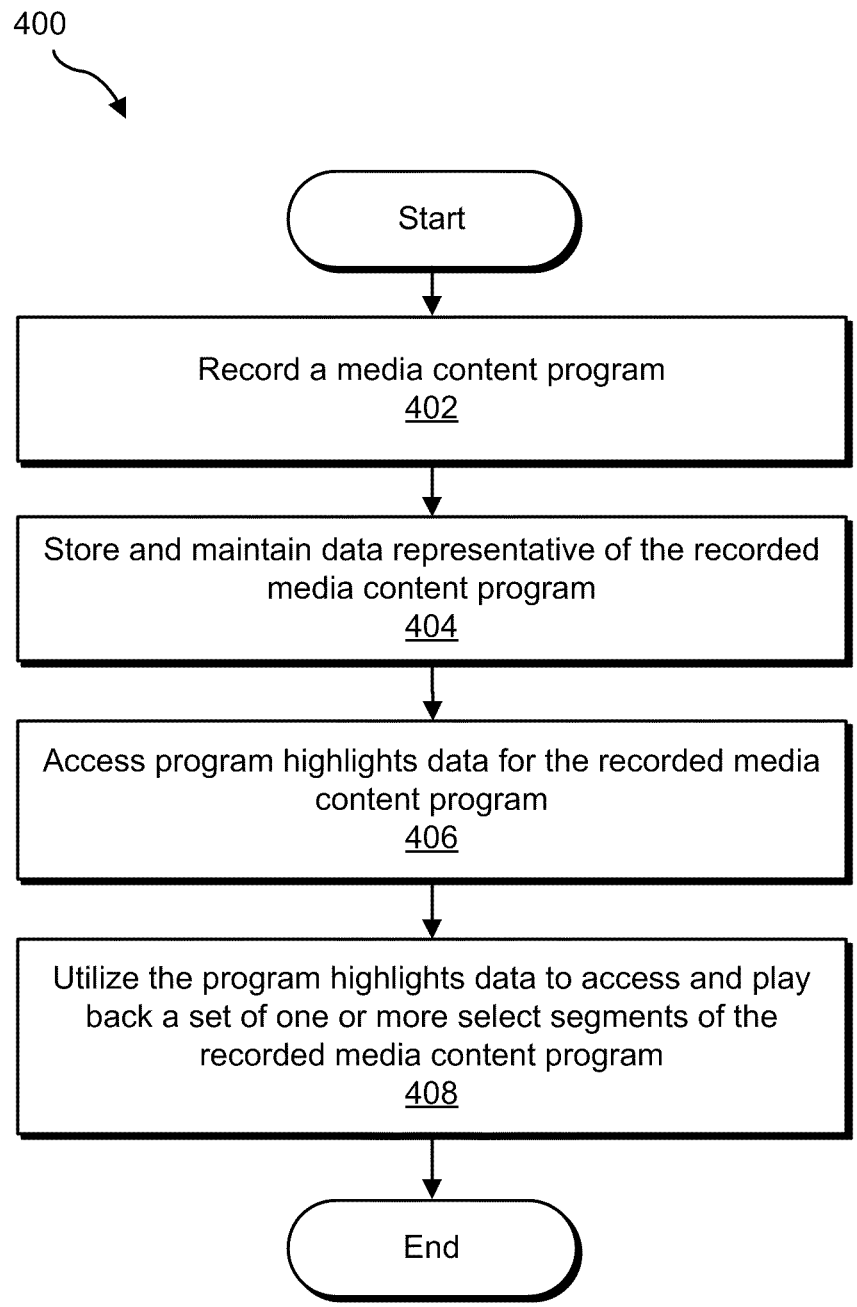
FIG. 4 illustrates an exemplary method of enhancing utilization of recorded media content.

FIG. 4 illustrates an exemplary method 400 of enhancing utilization of a recorded media content program. While FIG. 4 illustrates exemplary steps according to one embodiment, other embodiments may omit, add to, reorder, and/or modify any of the steps shown in FIG. 4. One or more of the steps shown in FIG. 4 may be performed by system 100, provider subsystem 202, access subsystem 204, and/or device 300.

In step 402, a media content program is recorded. Step 402 may be performed in any of the ways described above. For example, media content recording facility 104 may record the media content program, such as by recording a live transmission of the media content program.

In step 404, data representative of the recorded media content program is stored and maintained. Step 404 may be performed in any of the ways described above. For example, media content recording facility 104 may store data representative of the recorded media content program in data storage facility 112, which may maintain data representative of the recorded media program within recorded media content 114.

Metadata associated with the recorded media content program may also be stored and maintained. For example, metadata associated with the recorded media content program may be stored within data storage facility 112, which may maintain the metadata associated with the recoded media content program within metadata 116.

In step 406, program highlights data for the recorded media content program may be accessed. As mentioned, the program highlights data for the recorded media content program may specify a set of one or more select segments in the recorded media content program. The set of one or more select segments may represent one or more highlights in the recorded media content program.

Figure 5:
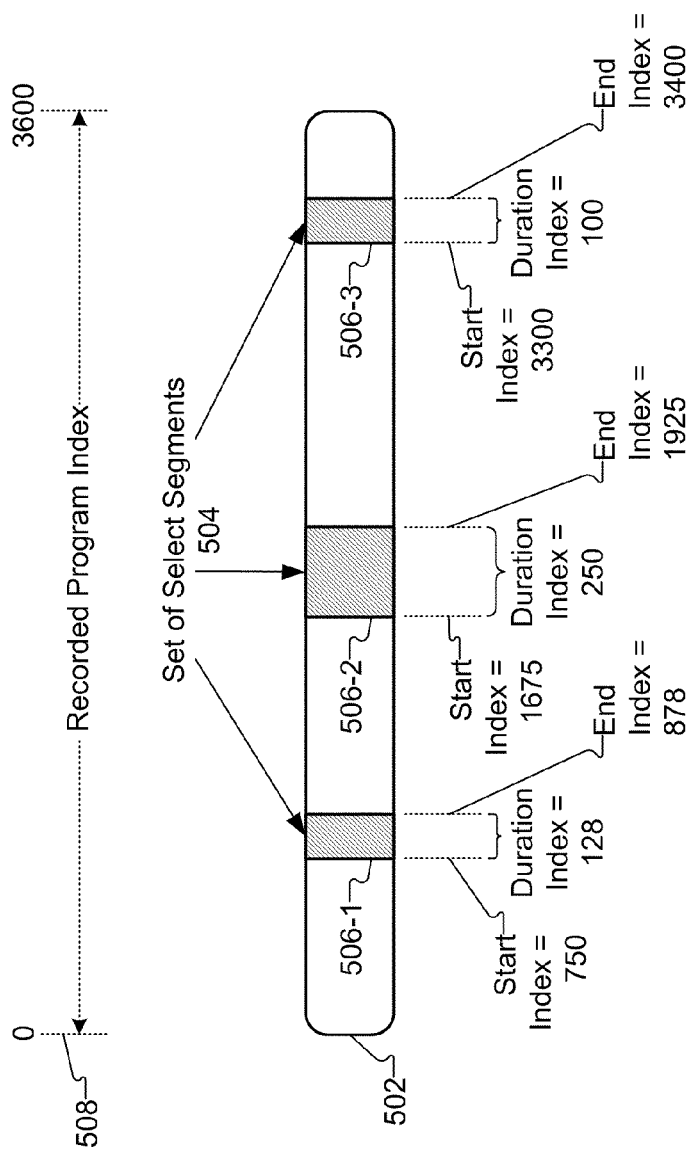
FIG. 5 illustrates an exemplary set of select segments within a recorded media content program.

To illustrate, FIG. 5 shows an exemplary set 504 of select segments 506 (e.g., 506-1 through 506-3) within a recorded media content program 502. As will be described in more detail below, segments 506 may each include one or more highlights contained within the recorded media content program 502.

The program highlights data accessed in step 406 at FIG. 4 may include any data suitable for identifying the set of one or more segments in the recorded media content program. In certain embodiments, for example, the program highlights data may include indexing data that identifies index positions (i.e., index values) associated with one or more segments of the recorded media content program. To illustrate, FIG. 5 shows a recorded program index 508 (e.g., a recording buffer index) associated with the recorded media content program 502. In FIG. 5, the recorded program index 508 spans a range of index values from index value "0" to index value "3600," with index value "0" specifying a starting index and index value "3600" specifying an ending index for the recorded media content program 502. In certain examples, index value "0" may correspond to a global start time (e.g., a GPS start time) associated with the media content program.

The index values associated with the recorded media content program 502 may represent a unit-by-unit breakdown of the recorded media content program 502. An index value may correspond with any suitable unit of the recorded media content program 502. For example, an index value may correspond with one second of recording time and/or playback time of the recorded media content program. In the example illustrated in FIG. 5, segment 506-1 has a start index value of "500," an end index value of "628," and a duration index value of "128," segment 506-2 has a start index value of "1675," an end index value of "1925," and a duration index value of "250," and segment 506-3 has a start index value of "3300," an end index value of "3400," and a duration index value of "100." In some examples, index values such as the start and end index values may represent offsets from a global start index of the recoded media content program 502.

The indexing data may be represented within program highlights data in any way suitable for facilitating playback of a set of one or more segments of a recorded media content program. For example, indexing data may include, without limitation, a global start time (e.g., a GPS time) of the recorded media content program, a duration of the recorded media content program, one or more offsets from the global start time, and one or more durations corresponding to the one or more offsets. Index offset values and corresponding index durations may specify one or more segments of the recorded media content program relative to the global start time of the recorded media content program.

As an example, FIG. 6 illustrates a table 600 of exemplary indexing data corresponding to the set 504 of select segments 506 of the recorded media content program 502 shown in FIG. 5. As shown, table 600 may include index values for each of the segments 506 included in the set 504 of select segments 506 of the recorded media content program 502. These indexing values may include start offset index values, end offset index values, and duration index values. The data included in table 600 is illustrative only. In other embodiments, certain indexing parameters and/or data values may be omitted from table 600 and/or additional indexing parameters and/or data values may be included in table 600. For example, end offset index values or duration index values may be omitted.

Returning to FIG. 4, in step 408, the program highlights data is utilized to access and play back a set of one or more select segments of the recorded media content program. For example, enhancement facility 106 and/or media content presentation facility 108 may utilize the program highlights data to access and play back the set of one or more select segments of the recorded media content program. In certain examples, this may include utilizing indexing data included in the program highlights data to index the recorded media content program to access and play back the set of one or more select segments of the recorded media content program. For instance, indexing data included in table 600 of FIG. 6 may be utilized together with a global start time of the recorded media content program to jump to a start offset index value associated with a segment of the recorded media content program (e.g., segment 506-1 of recorded media content program 502). Playback may be initiated at the start offset index value and continue until an end offset index value and/or duration index value associated with the segment is reached. Playback may then jump to another start offset index value associated with another segment and continue until an end offset index value and/or duration index value associated with the other segment is reached. This playback pattern may be repeated for each other segment included in the set of select segments of the recorded media content program. In this manner, a set of one or more select segments may be automatically played back for experiencing by a user in accordance with program highlights data associated with the recorded media content program, without the user having to manually utilize trick play modes (e.g., fast-forward, skip, rewind, etc.) within the recorded media content program. Significantly, the indexing of the recorded media content program to access and play back a set of one or more select segments of the recorded media content program may avoid creating a copy of the one or more select segments of the recorded media content program.

As mentioned, a global start time associated with a recorded media content program may be used in conjunction with one or more index values to access and play back one or more select segments of the recorded media content program. The global start time may facilitate uniform offset-based indexing across multiple media content processing devices even when there are recording discrepancies (e.g., various actual recording start times, partial recordings, etc.) across the multiple devices.

In addition, in some examples, one or more error-checking procedures may be employed to account for potential recording discrepancies. For example, one or more checks may be performed to determine whether index values included are within the start and end index values of an actual recording. Such a check may be performed by comparing index values relative to a global start time. Accordingly, if a particular segment of a media content program was not recorded and is consequently not included in an actual recording of the media content program (e.g., an actual recording was initiated after the segment had already been received and processed by a media content processing device), this condition may be detected and the segment skipped over in the playback of a set of segments in order to avoid error.

One or more of the steps shown in FIG. 4 may be performed by an end-user media content processing device, a network device providing a network-based media content recording service to an end-user media content processing device, or a combination thereof. As an example, an end-user media content processing device, such as an end-user DVR device, may record a media content program, store and maintain data representative of the recorded media content program in a local data storage facility, access program highlights data for the recorded media content program, and utilize the program highlights data to access and playback a set of one or more select segments of the recorded media content program for experiencing by user of the device.

The end-user device may access the program highlights data for the recorded media content program from any suitable source. For example, the end-user device may access program highlights data within metadata associated with the recorded media content program. For instance, the metadata associated with the recorded media content program may include a "program highlights" field in which the program highlights data and/or a link to the program highlights data may be stored. Enhancement facility 106 of system 100 may be configured to look to the "program highlights" field in the metadata to locate program highlights data for the recorded media content program. The metadata may be stored in a local data storage facility or in another data storage facility accessible to the end-user device.

In certain examples, program highlights data may be provided within media content program metadata in conjunction with a recording of the media content program. In other examples, program highlights data may be subsequently requested and received by an end-user device from a program highlights data source (e.g., a device external to the end-user device) and inserted into the "program highlights" field in the metadata for subsequent retrieval and utilization to play back a set of one or more select segments of the recorded media content program. To illustrate, the end-user device may request and receive the program highlights data from a server device over a network. For instance, where the end-user device is associated with access subsystem 204 shown in FIG. 2, the end-user device may request and receive the program highlights data from a device associated with provider subsystem 202 or from another device via network 206. Accordingly, program highlights data may be dynamically accessed and utilized, such as at runtime of a media content processing device. For instance, at one or more suitable times after a media content program has been recorded and its metadata stored in conjunction with the recording, a program highlights data field in the metadata may be dynamically updated with up-do-date program highlights data that has been dynamically requested and received from another source such as a server device.

In certain examples, the program highlights data may be obtained from one or more devices (e.g., a server device) associated with a producer of the recorded media content program, a distributor of the recorded media content program, or a third-party providing a program highlights service. For example, the end-user device may request and receive the program highlights data from a media content producer server device or from a media content distributor server device that has previously obtained the program highlights data from a media content producer or third-party providing a program highlights service. To illustrate, a producer of a media content program may define program highlights data for the media content program and provide or otherwise make the program highlights data accessible to a device associated with a distributor and/or consumer of the media content program. For example, a content producer such as ESPN may produce a televised sports event and define program highlights data specifying a set of one or more select highlights (e.g., "moments of the game") included in the sports event. An end-user device may record the sports event and access and utilize the program highlights data to play back the set of one or more select highlights of the sports event, as described above.

As an alternative example, a network device (e.g., a media content distributor device) providing a network-based media content recording service to an end-user media content processing device may record a media content program, store and maintain data representative of the recorded media content program in a network data storage facility, access program highlights data for the recorded media content program, and utilize the program highlights data to access and play back a set of one or more select segments of the recorded media content program for experiencing by user of the device.

The network device may access the program highlights data for the recorded media content program from any suitable source, including from a device external to the network device or from any of the sources and/or in any of the ways described above. The network device may utilize the program highlights data to access and play back a set of one or more select segments of the recorded media content program by streaming data representative of the set of one or more select segments of the recorded media content program to a end-user media content processing device for playback.

An end user (e.g., a user of an end-user media content processing device) may have control of selection and playback of a set of one or more select segments of a recorded media content program. For example, a user interface may be provided to an end user and may include one or more tools configured to facilitate end-user control of selection and playback of a set of one or more select segments of a recorded media content program. Accordingly, one or more of the steps shown in FIG. 4 may be performed in response to an end-user selection of a menu option for accessing and playing back highlights of a recorded media content program. For example, system 100 may detect user input indicating a user selection of a "program highlights" menu option in a user interface and perform step 406 and/or step 408 in response to the detected user selection.

To illustrate, FIGS. 7-10 show GUIs displaying exemplary views associated with a "program highlights" menu option that may be provided for selection by a user. The GUIs may be generated and provided for display by system 100 (e.g., user interface facility 110 of system 100), media content provider subsystem 202, media content access subsystem 204, device 300, and/or any media content processing device.

Figure 7:
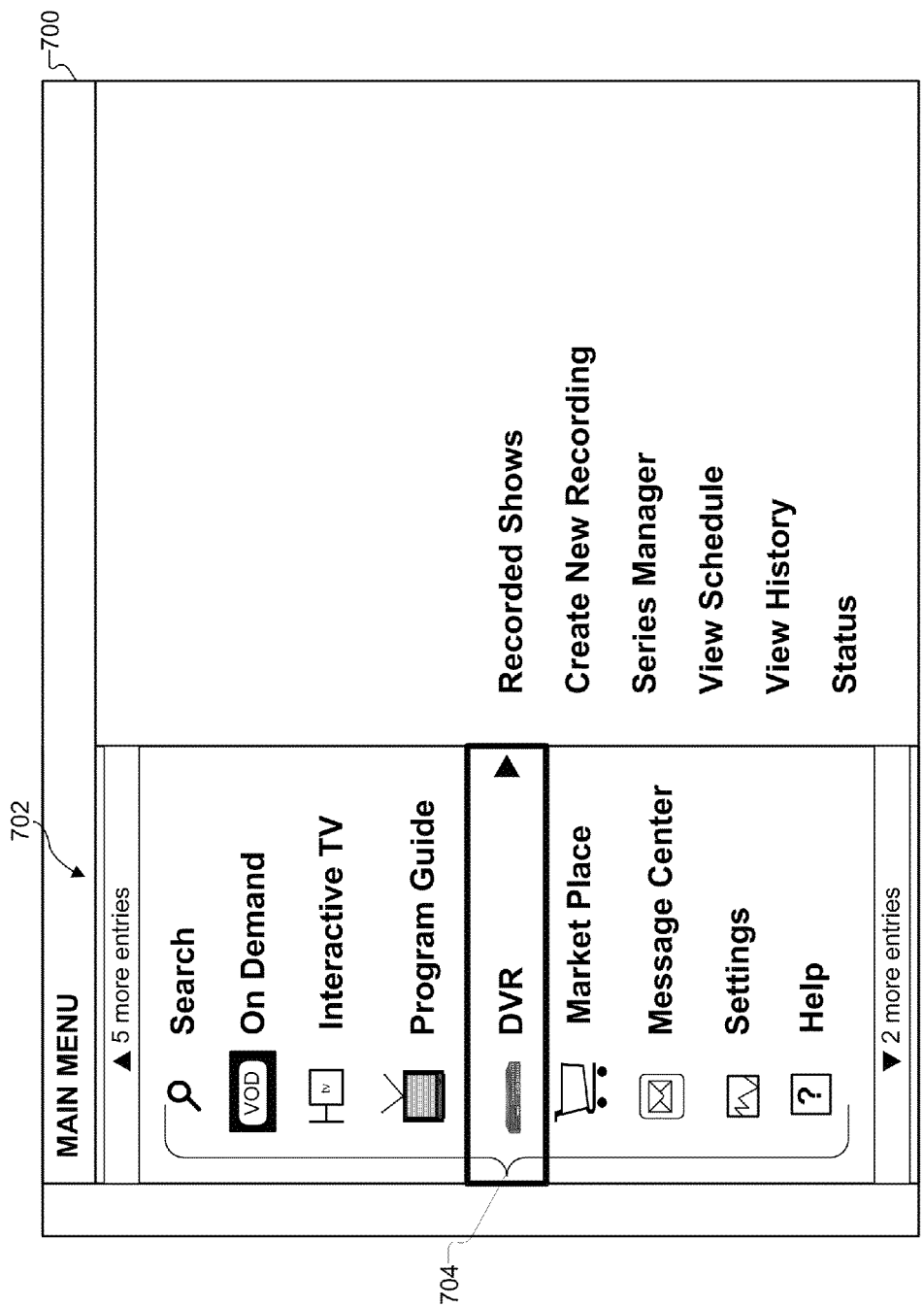
FIG. 7 illustrates a graphical user interface having an exemplary main menu view displayed therein.

FIG. 7 illustrates a GUI 700 having a main menu view 702 displayed therein. As shown in FIG. 7, main menu view 702 may include a plurality of menu options 704. In response to a user selection of a "DVR" (digital video recording) menu option within the plurality of menu options 704, a DVR main menu view may be provided for display.

Figure 8:
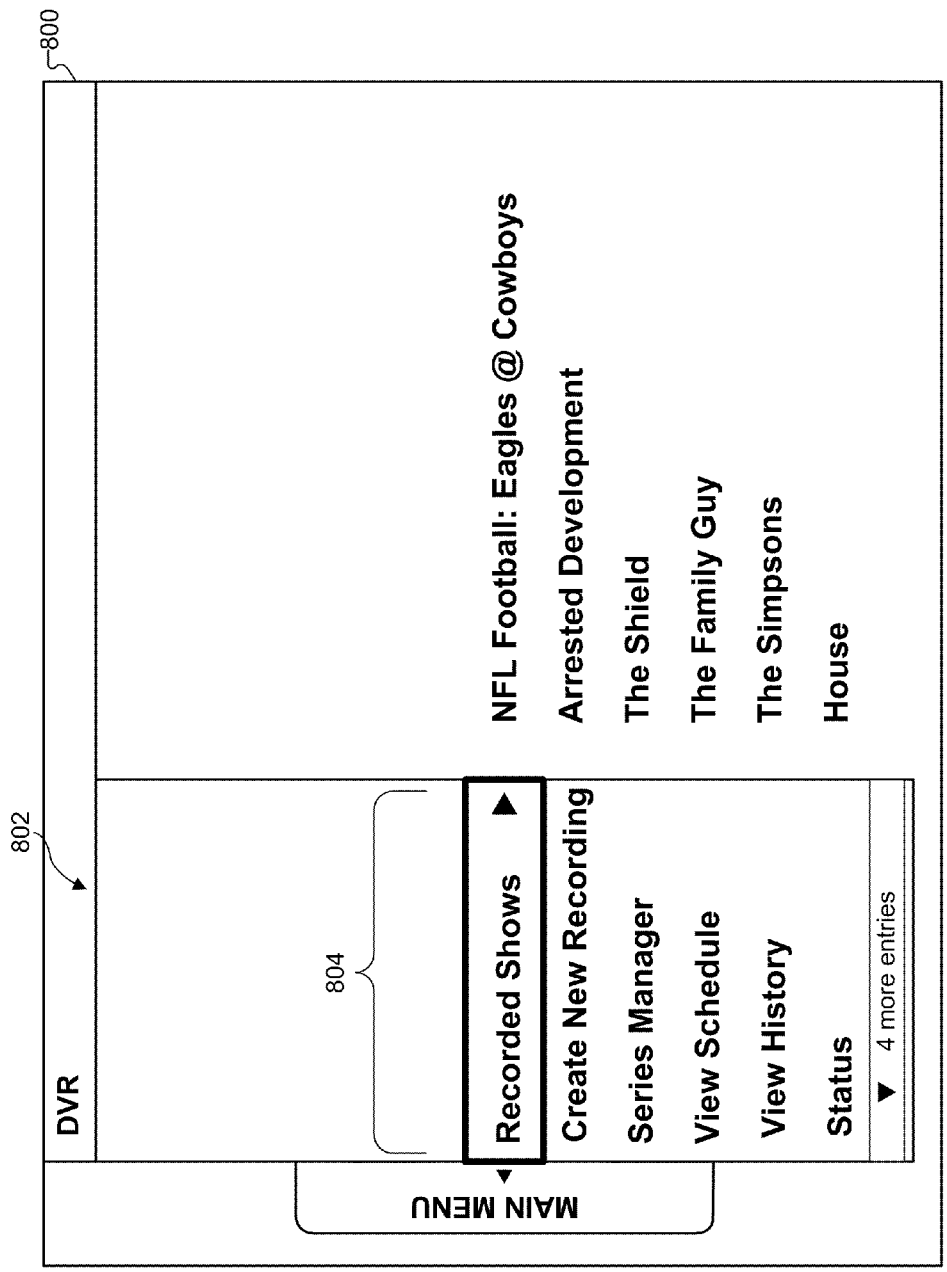
FIG. 8 illustrates a graphical user interface having an exemplary digital video recording ("DVR") menu displayed therein.

For example, FIG. 8 illustrates a GUI 800 having an exemplary DVR menu view 802 displayed therein. As shown in FIG. 8, DVR menu view 802 may include a plurality of DVR menu options 804 displayed therein. In response to a user selection of a "recorded shows" option within the DVR menu options 804, a recorded shows menu view may be provided for display.

Figure 9:
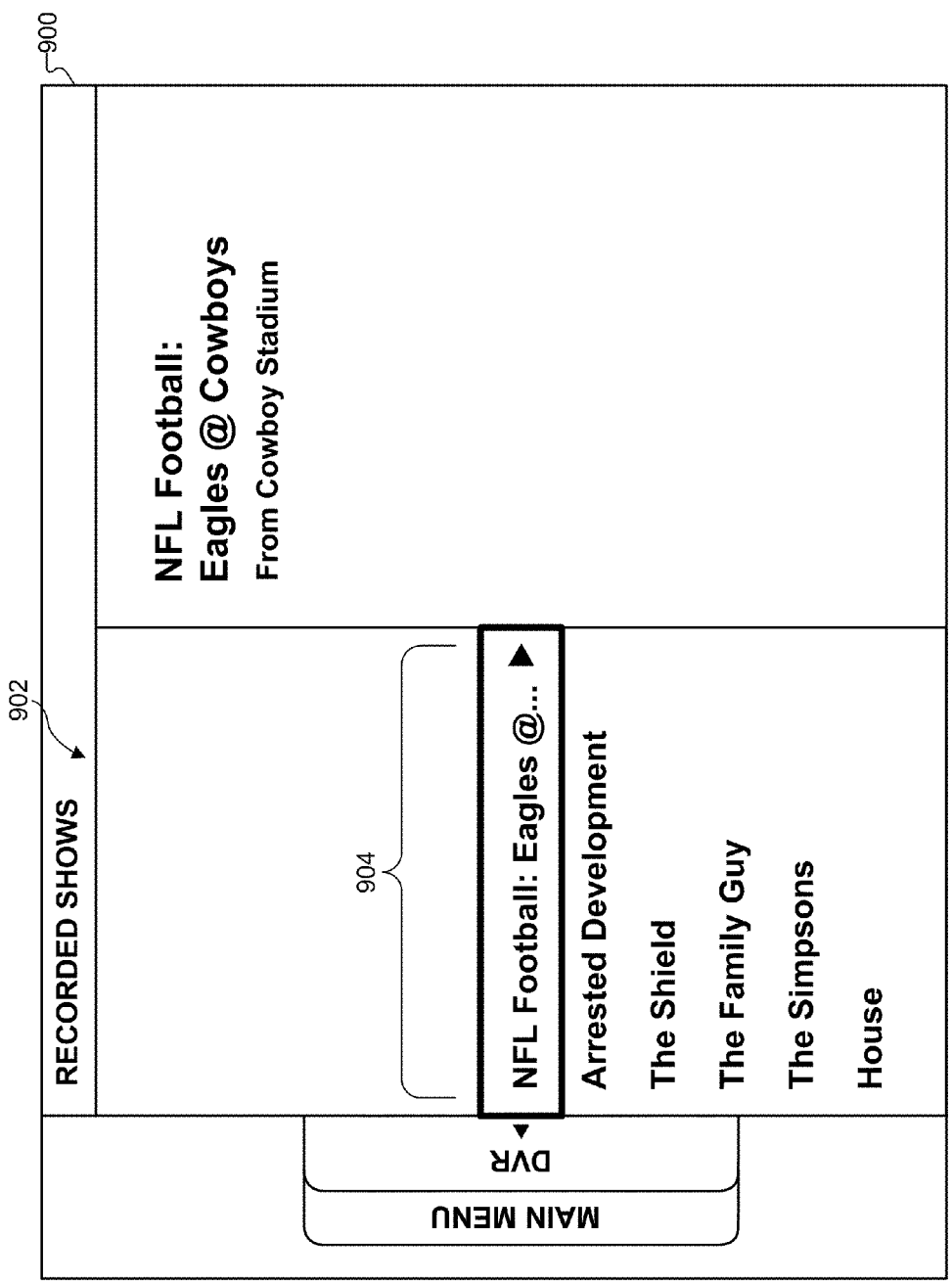
FIG. 9 illustrates a graphical user interface having an exemplary recorded shows menu view displayed therein.

For example, FIG. 9 illustrates a GUI 900 having an exemplary recorded shows menu view 902 displayed therein. As shown in FIG. 9, recorded shows menu view 902 may include graphical data representative of a plurality of recorded media content programs 904 displayed therein. The recorded programs represented in recorded shows menu view 902 may comprise media content programs that have been recorded to a data storage facility (e.g., to data storage facility 112 by media content recording facility 104). In the example illustrated in FIG. 9, one of the recorded programs is labeled "NFL Football: Eagles @ Cowboys," which corresponds to a particular recorded media content program.

Figure 10:
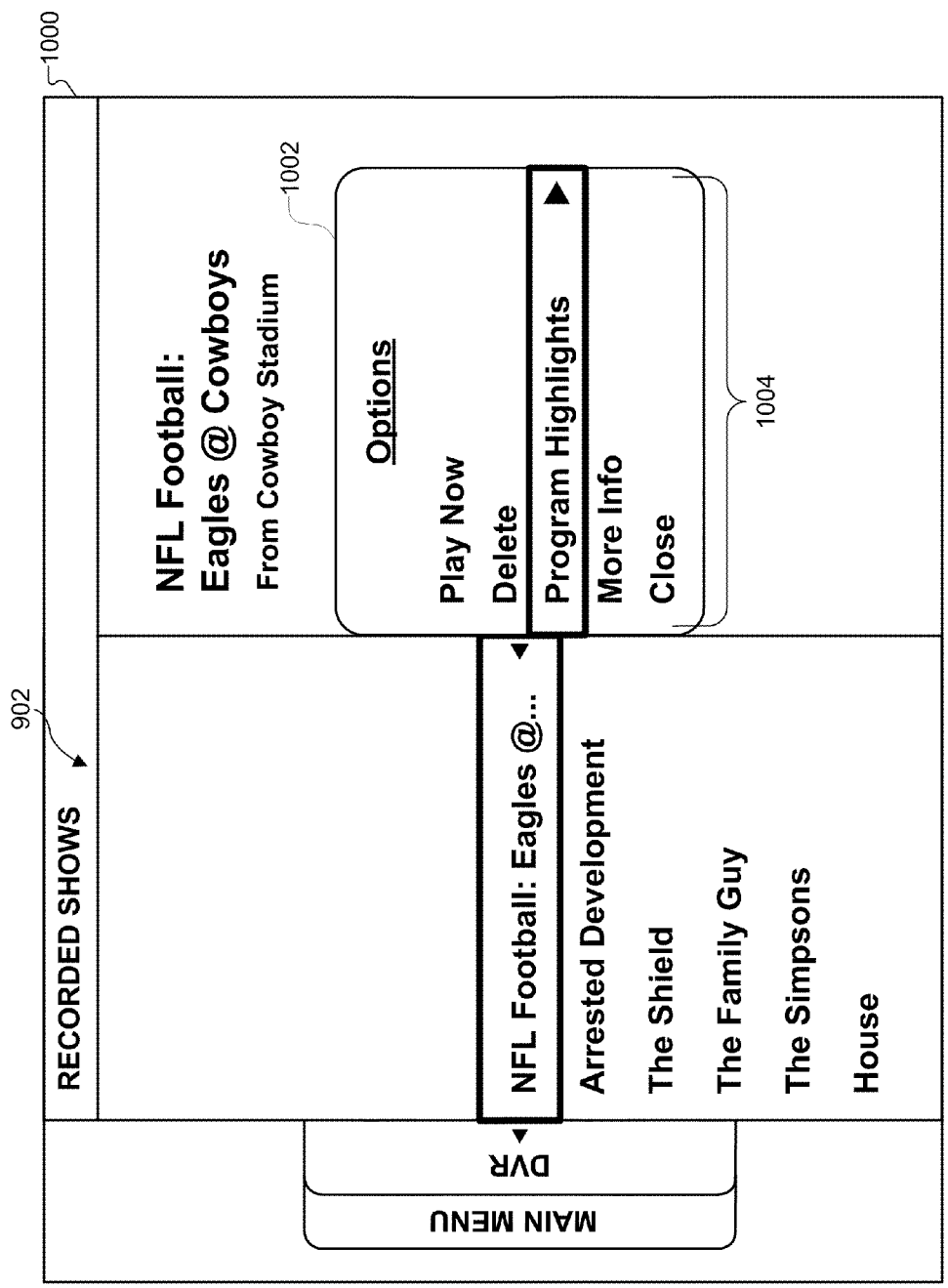
FIG. 10 illustrates a graphical user interface having exemplary selectable options associated with a selected recorded media content program displayed therein.

In response to a user selection of a graphical data object associated with a recorded media content program in recorded shows menu view 902, a program options view may be provided for display. For example, FIG. 10 illustrates a GUI 1000 having an exemplary program options view 1002 displayed therein. As shown in FIG. 10, program options view 1002 may include a plurality of options 1004 associated with the selected media content program (the media content program known as "NFL Football: Eagles @ Cowboys"). In the illustrated example, the plurality of options 1004 includes a "play now" option, a "delete" option, a "program highlights" option, a "more info" option, and a "close" option. In response to a user selection of the "program highlights" option shown in FIG. 10, step 406 and/or step 408 of FIG. 4 may be performed to present a set of one or more highlights of the recorded media content program (e.g., one or more moments of the game) as specified by program highlights data associated with the recorded media content program. Accordingly, if a user desires to watch only select highlights of a recorded media content program (e.g., the user does not have time to watch the entire program), the user may select an option such as the "program highlights" option shown in FIG. 10 to initiate playback of a set of select highlights of the recorded media content program.

In certain embodiments, system 100 may be configured to check for updates to program highlights data periodically (e.g., nightly) and/or in response to a predetermined event. For example, when a user browses to a GUI in which data representative of a recorded media content program is to be included, system 100 may check for any updates to program highlights data associated with the recorded media content program. The check may be performed in any suitable way, including sending a request for updated program highlights data to a server device. In certain examples, schedules for requesting program highlights data may be randomized across media content processing devices to avoid inundating a server device at any particular time such as immediately following a transmission of a media content program.

In certain embodiments, a set of one or more select segments representing a set of one or more highlights of a recorded media content program may be defined by an end user such as a user of access subsystem 204 and/or an end-user media content processing device. To this end, at least one tool configured to facilitate a user definition of a set of one or more select segments of a recorded media content program may be provided. For example, user interface facility 110 of system 100 may provide a user interface (e.g., a GUI) including one or more tools that facilitate end-user definition of a set of one or more select segments of a recorded media content program. To this end, in some examples, at least one tool configured to facilitate a user-definition of a segment (e.g., a clip) of a recorded media content program and user-compilation of one or more user-defined segments into a playlist may be provided.

Figure 11:
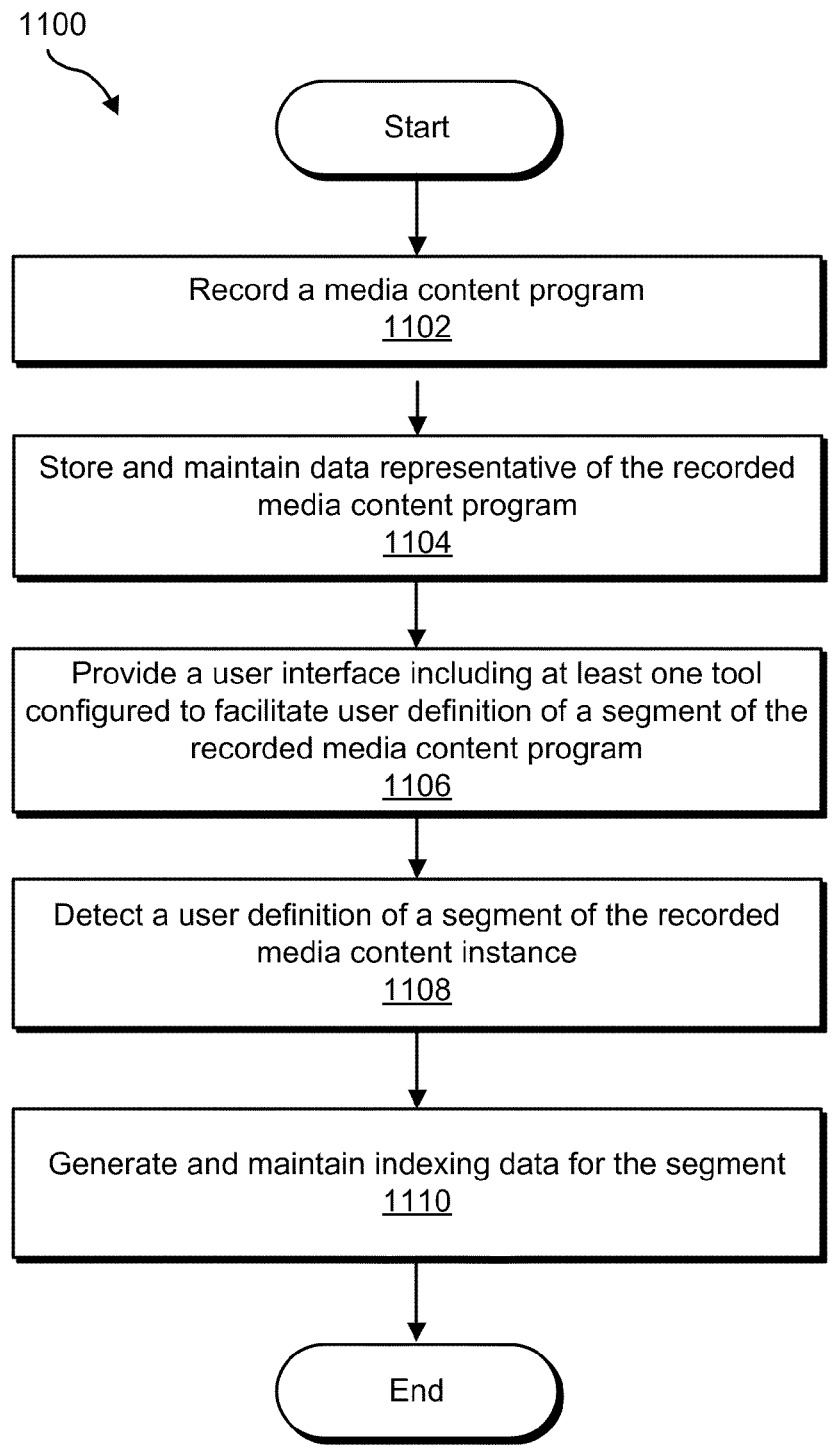
FIG. 11 illustrates an exemplary method of facilitating a user-definition of a segment of a recorded media content program.

FIG. 11 illustrates an exemplary method 1100 of facilitating a user-definition of a segment of a recorded media content program. While FIG. 11 illustrates exemplary steps according to one embodiment, other embodiments may omit, add to, reorder, and/or modify any of the steps shown in FIG. 11. One or more of the steps shown in FIG. 11 may be performed by system 100, provider subsystem 202, access subsystem 204, and/or device 300.

In step 1102, a media content program is recorded. Step 1102 may be performed in any of the ways described above. For example, media content recording facility 104 may record the media content program, such as by recording a live transmission of the media content program.

In step 1104, data representative of the recorded media content program is stored and maintained. Step 1104 may be performed in any of the ways described above. For example, media content recording facility 104 may store data representative of the recorded media content program in data storage facility 112, which may maintain data representative of the recorded media program within recorded media content 114. As described above, metadata associated with the recorded media content program may also be stored and maintained.

In step 1106, a user interface including at least one tool configured to facilitate a user definition of a segment of the recorded media content program is provided. For example, user interface facility 110 of system 100 may provide one or more GUIs including one or more tools that facilitate a user definition of a segment of the recorded media content program. To illustrate, FIGS. 12-15 illustrate exemplary graphical user interfaces providing at least one tool configured to facilitate a user-definition of a segment of a recorded media content program.

Figure 12:
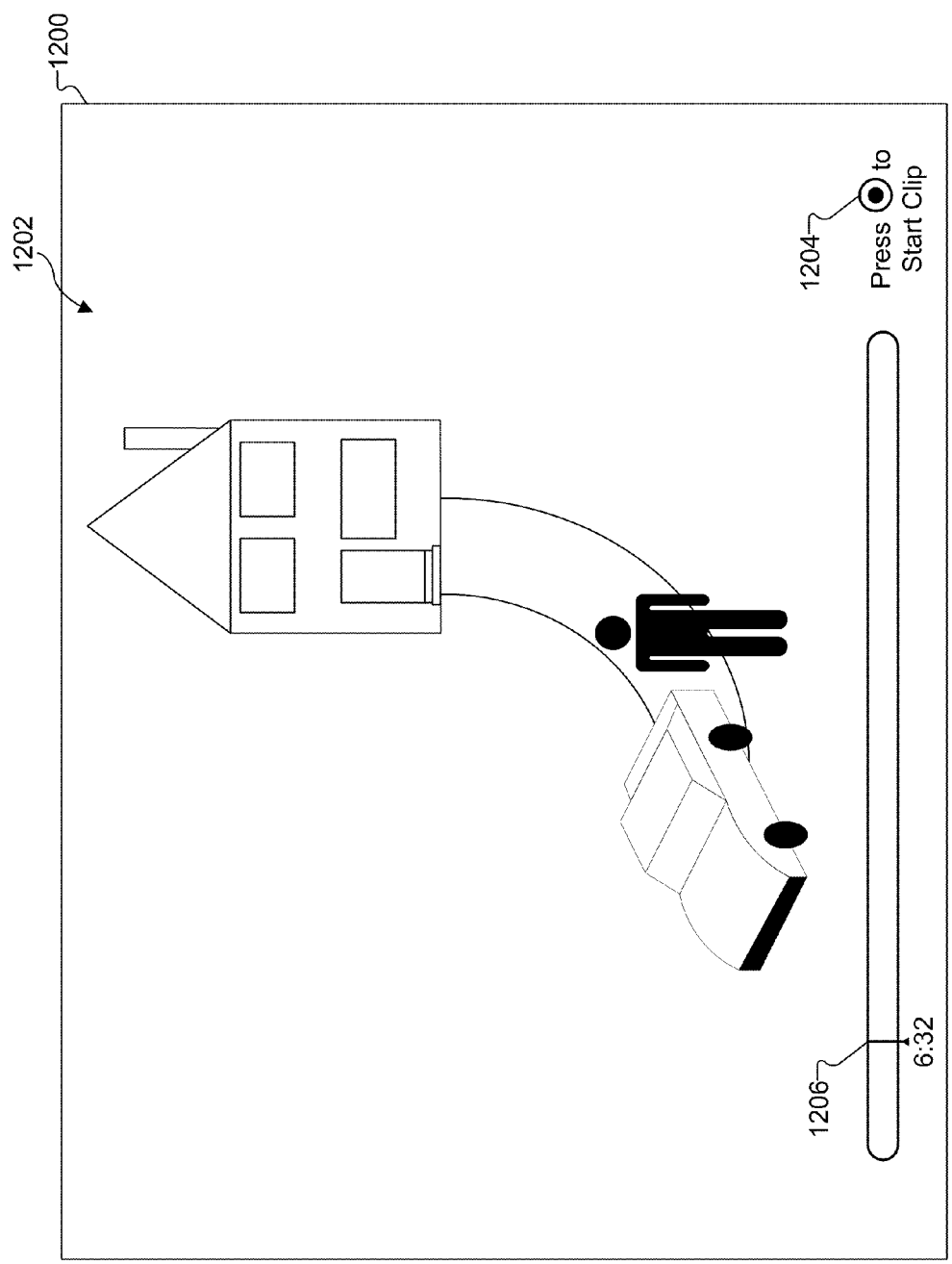
FIGS. 12-15 illustrate exemplary graphical user interfaces providing at least one tool configured to facilitate user-definition of a segment of a recorded media content program.

FIG. 12 illustrates a GUI 1200 having an exemplary media content presentation view 1202 displayed therein. As shown in FIG. 12, GUI 1200 may provide a full-screen display of media content presentation view 1202. A media content program may be presented (e.g., played back) within media content presentation view 1202. In FIG. 12, an on-screen image of a previously recorded media content program being presented in media content presentation view 1202 is displayed. In some examples, the on-screen image displayed in FIG. 12 may coincide with a frame in a video stream of the media content program.

GUI 1200 may include at least one tool configured to facilitate a user-definition of a segment of the media content program being presented in media content presentation view 1202. Any suitable tool may be provided. In GUI 1200, the tool includes a particular input command and a graphical object 1204 indicating the particular input command (e.g., a "record" button on a remote control input device) that may be provided to mark a starting point of a segment (i.e., a clip) of a media content program. GUI 1200 may further include a graphical object 1206 indicating a current playback position within the media content program.

During presentation of the media content program in media content presentation view 1202, a user may provide input indicating a desire of the user to define a starting point of a segment of the media content program. For example, the user may actuate a particular input button. The user input may be detected and a starting point of a new user-defined segment marked. For example, a starting index associated with a playback time of "6:32" shown in FIG. 12 may be marked for a new user-defined segment in response to the detected user input.

Figure 13:
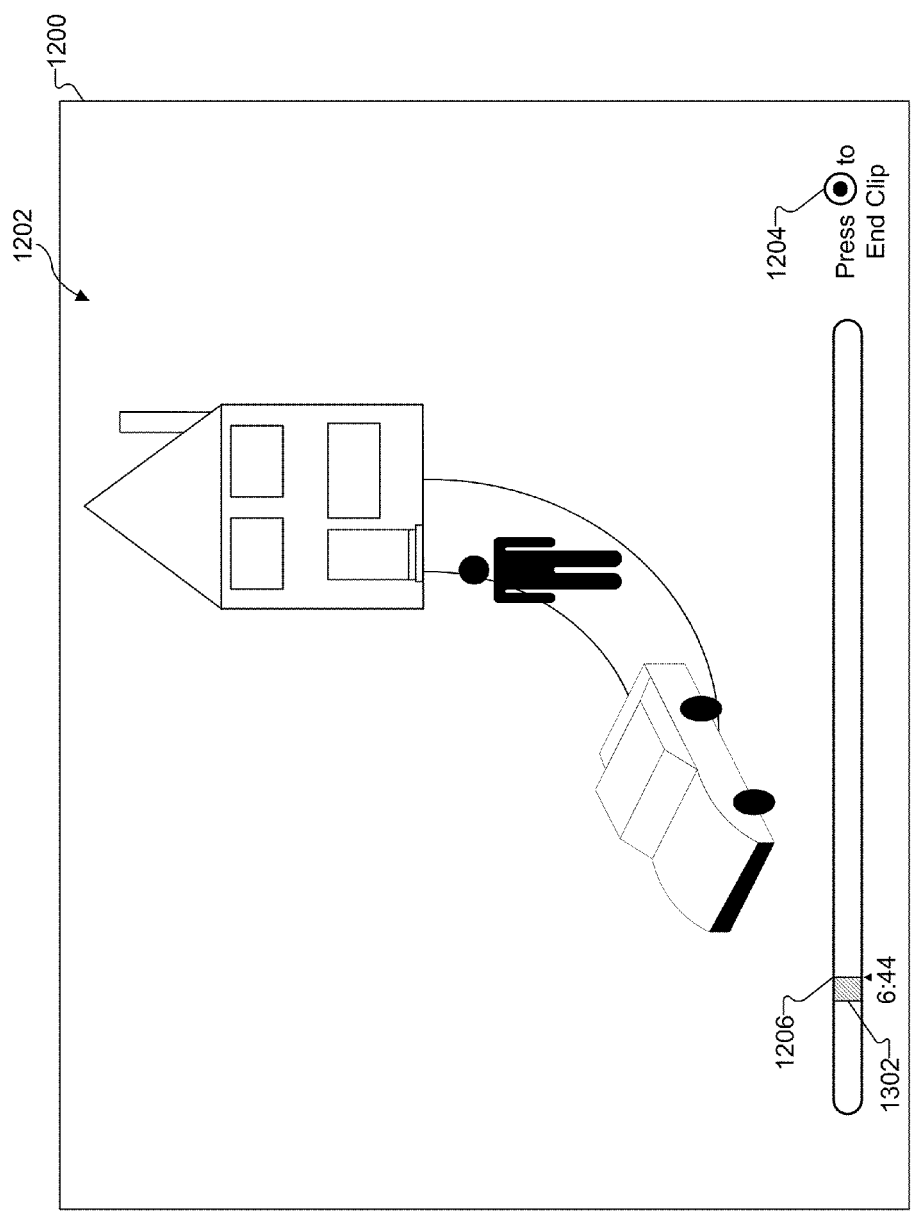

The presentation of the media content program in media content presentation view 1202 may continue. When the user wants to mark an ending point of the user-defined segment, the user may again provide input indicating this intention. For example, the user may actuate a particular input button. The user input may be detected and an ending point of the new user-defined segment marked. For example, an ending index associated with a playback time of "6:44" shown in FIG. 13 may be marked for the new user-defined segment in response to the detected user input. As shown in FIG. 13, a graphical object 1302 indicating the user-defined segment may be displayed in GUI 1200.

Figure 14:
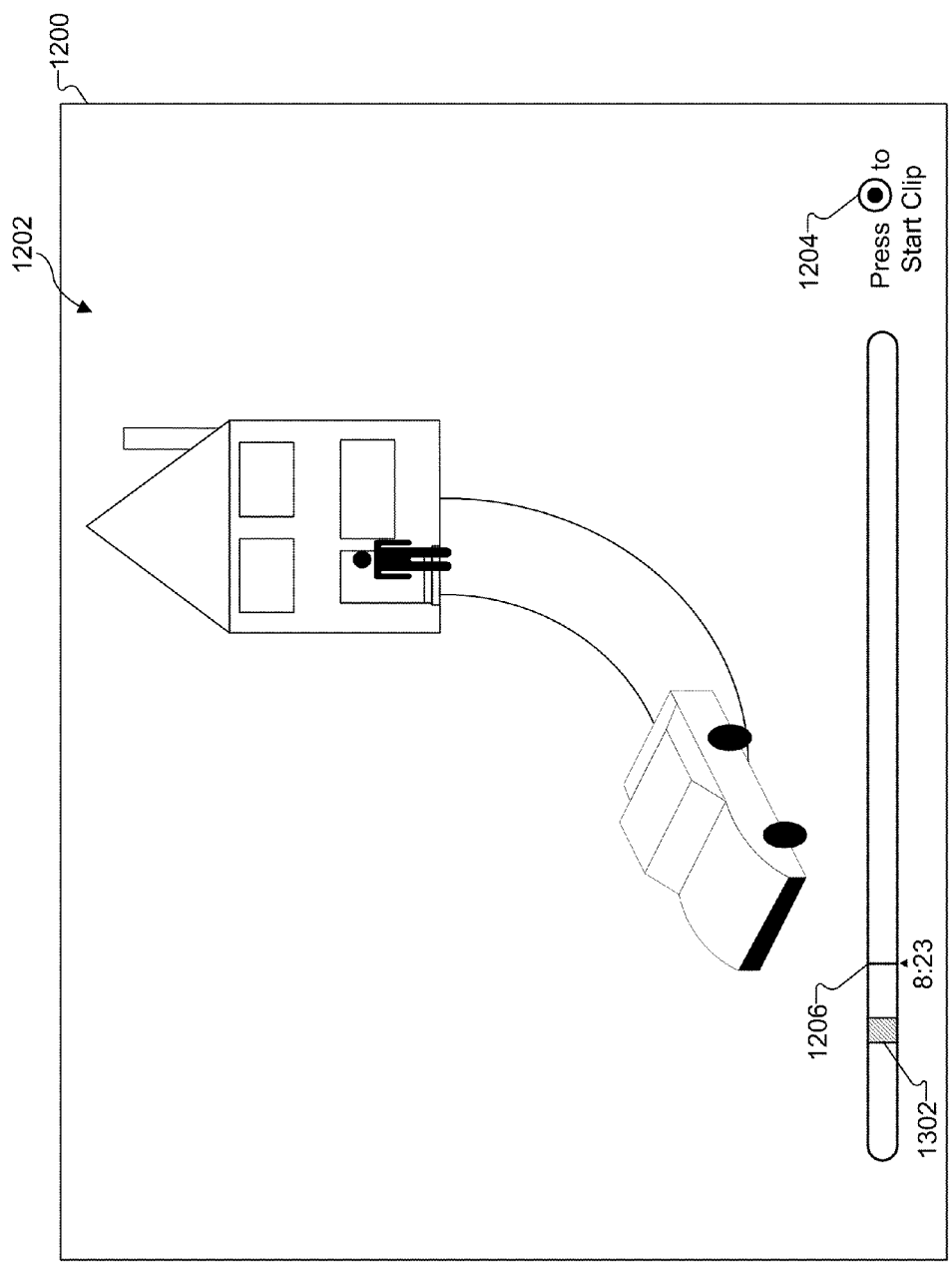

The presentation of the media content program in media content presentation view 1202 may continue after user definition of a segment of the media content program. For example, FIG. 14 shows a playback time of "8:23" in media content presentation view 1202. Accordingly, a user may continue to provide input to define one or more additional segments of the media content program during its presentation in media content presentation view 1202.

Figure 15:
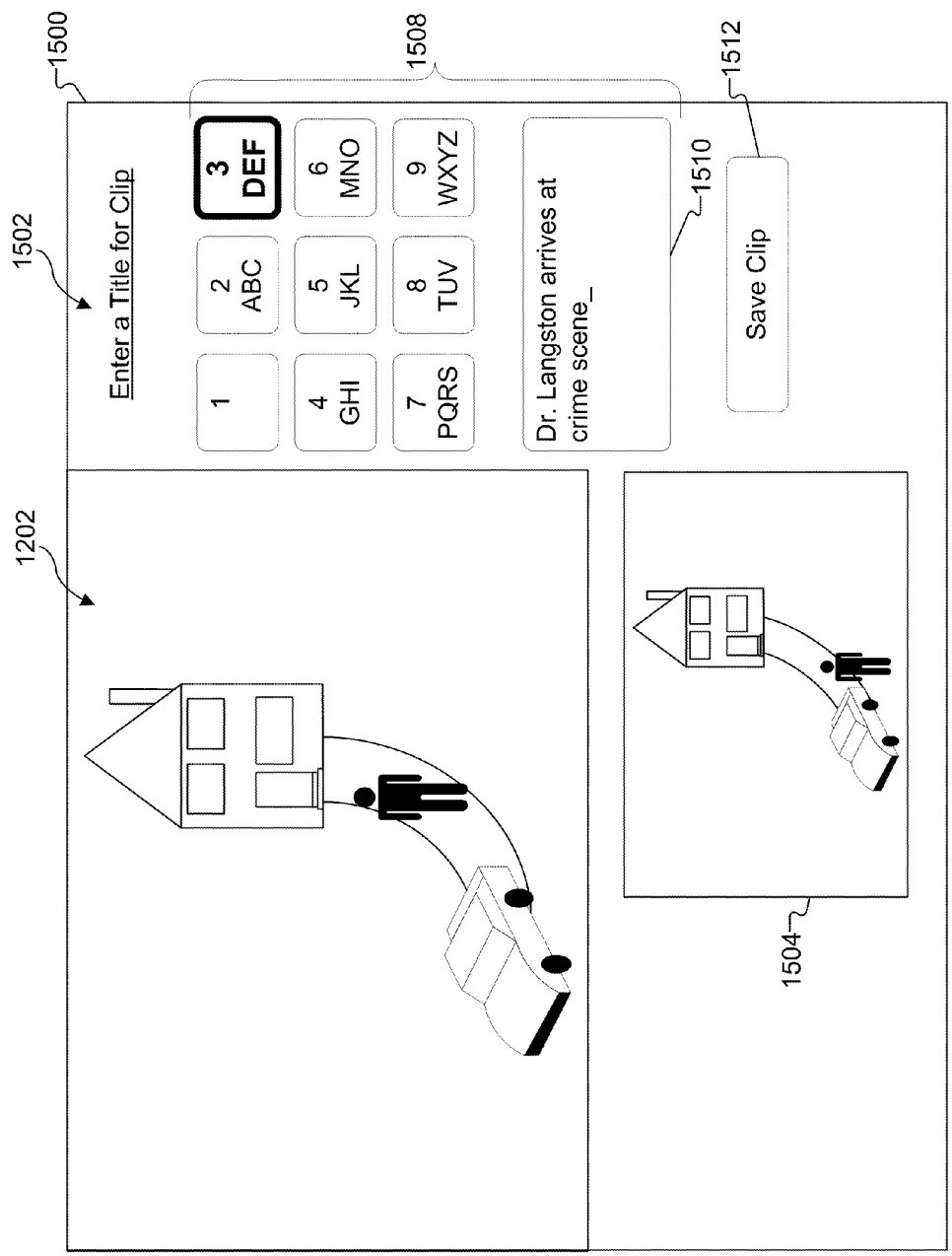

At any appropriate time after a user has defined starting and ending points of a segment of a media content program (e.g., when presentation of the media content program is paused or ended), one or more additional tools may be provided to further facilitate a user-definition of the segment. As an example, FIG. 15 illustrates a GUI 1500 having an exemplary clip data capture view 1502 displayed therein. As shown in FIG. 15, GUI 1500 may include media content presentation view 1202 displayed within a partial-screen display in GUI 1500. Presentation (e.g., playback) of the media content program may continue in media content presentation view 1202 in GUI 1500.

Clip data capture view 1502 may include information and/or one or more tools associated with capture of data related to a user-defined segment of a media content program. For example, clip data capture view 1502 may include a frame image 1504 graphically representing the user-defined segment of the media content program. The frame image 1504 may include an "i-frame" of an MPEG data stream, such as the first i-frame within the segment. The frame image 1504 may be used as a thumbnail image to graphically indicate the segment in one or more GUIs.

Clip data capture view 1502 may include a title input tool 1508, which may be configured to facilitate user input of a title for a segment. In the illustrated example, title input tool 1508 includes a plurality of selectable buttons that may be selected by user to spell out a title for the segment. As the user utilizes title input tool 1508 to provide a title, data representative of the title may be displayed in an input field 1510 of title input tool 1508, as shown in FIG. 15. Data (e.g., title, frame image, etc.) captured and associated with a user-defined segment of a media content program may be stored together with indexing data defining the segment, including as part of metadata associated with the media content program.

After the user has provided a title for the user-defined segment, the user may select a save command button 1512 to indicate that the segment (i.e., clip) and corresponding data be saved to a data storage facility such as data storage facility 112 of system 100.

Returning now to FIG. 11, in step 1108, a user definition of a segment of the recorded media content program is detected. For example, user interface facility 110 of system 100 may detect a user definition of a segment of the recorded media content program such as by detecting any of the user input described above in relation to FIGS. 12-15. For instance, a user selection of the save command button 1512 in GUI 1500 may be detected and may indicate that a user has requested that data representative of a segment be created and stored to a data storage facility.

In step 1110, indexing data for the segment is generated and maintained. For example, enhancement facility 106 of system 100 may generate data representative of the user-defined segment, which data may include indexing data indicating one or more of a starting index value, an ending index value, and a duration index value for the segment. The indexing data may include one or more offsets from a global starting time of the media content program, as described above. The data representative of the user-defined segment, including the indexing data for the segment as well as other data related to the user-defined segment, may be maintained in a data storage facility such as data storage facility 112 of system 100 (e.g., as part of metadata or in a separate file associated with the media content program). The maintaining of indexing data of a user-defined segment may avoid creating a copy of the user-defined segment.

In the above-described or similar manner, an end user may define one or more segments within a recorded media content program. In certain embodiments, at least one tool may be provided to an end user that facilitates utilization of the user-defined segments.

Figure 16:
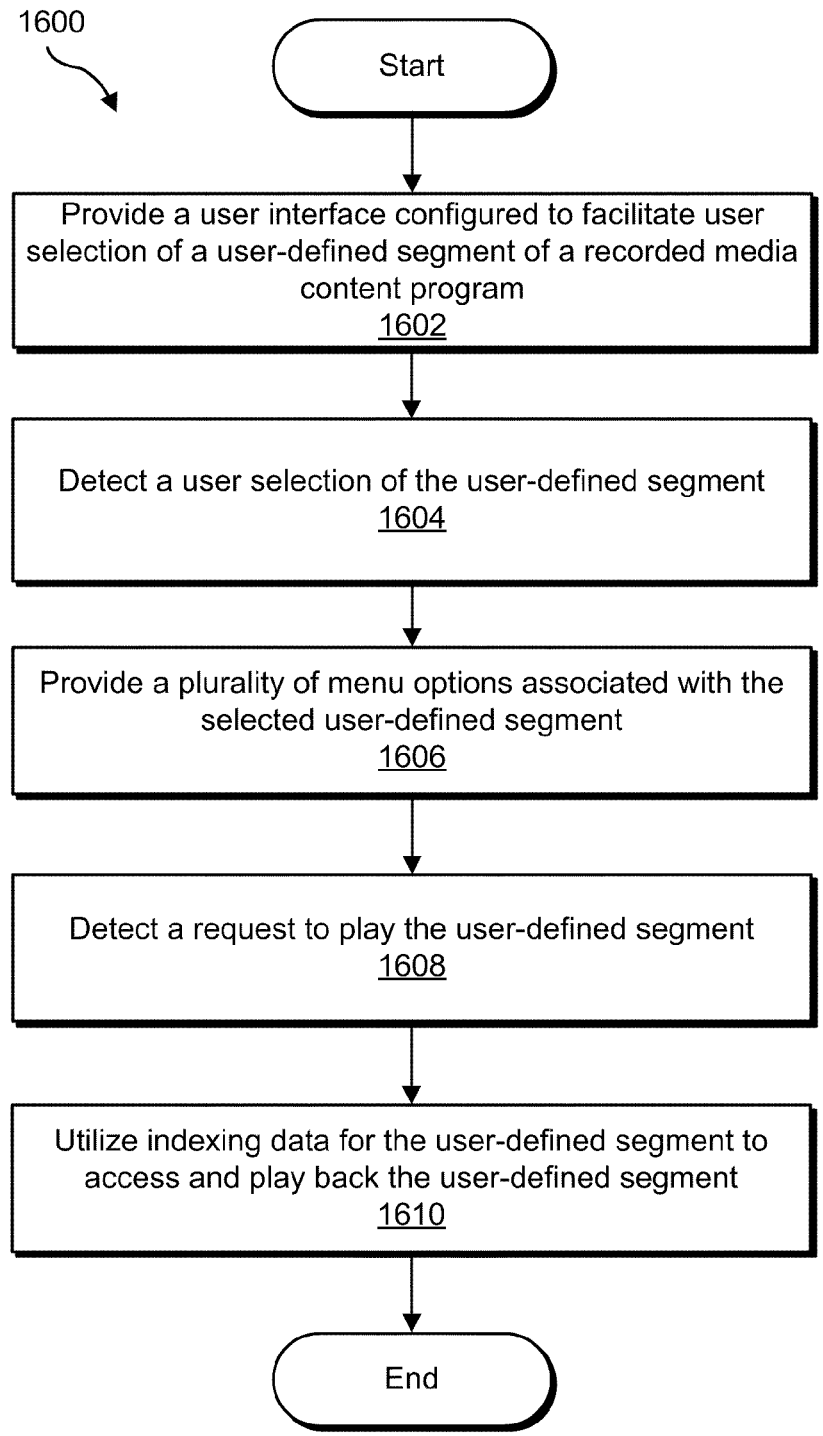
FIG. 16 illustrates an exemplary method of utilizing a user-defined segment of a recorded media content program.

FIG. 16 illustrates an exemplary method 1600 of utilizing a user-defined segment of a recorded media content program. While FIG. 16 illustrates exemplary steps according to one embodiment, other embodiments may omit, add to, reorder, and/or modify any of the steps shown in FIG. 16. One or more of the steps shown in FIG. 16 may be performed by system 100, provider subsystem 202, access subsystem 204, and/or device 300.

In step 1602, a user interface configured to facilitate a user selection of a user-defined segment of a recorded media content program is provided. For example, user interface facility 110 of system 100 may provide one or more GUIs including one or more tools that facilitate a user selection of a user-defined segment of the recorded media content program. To illustrate, FIGS. 17-19 illustrate exemplary GUIs providing at least one tool configured to facilitate a user selection of a user-defined segment of a recorded media content program.

Figure 17:
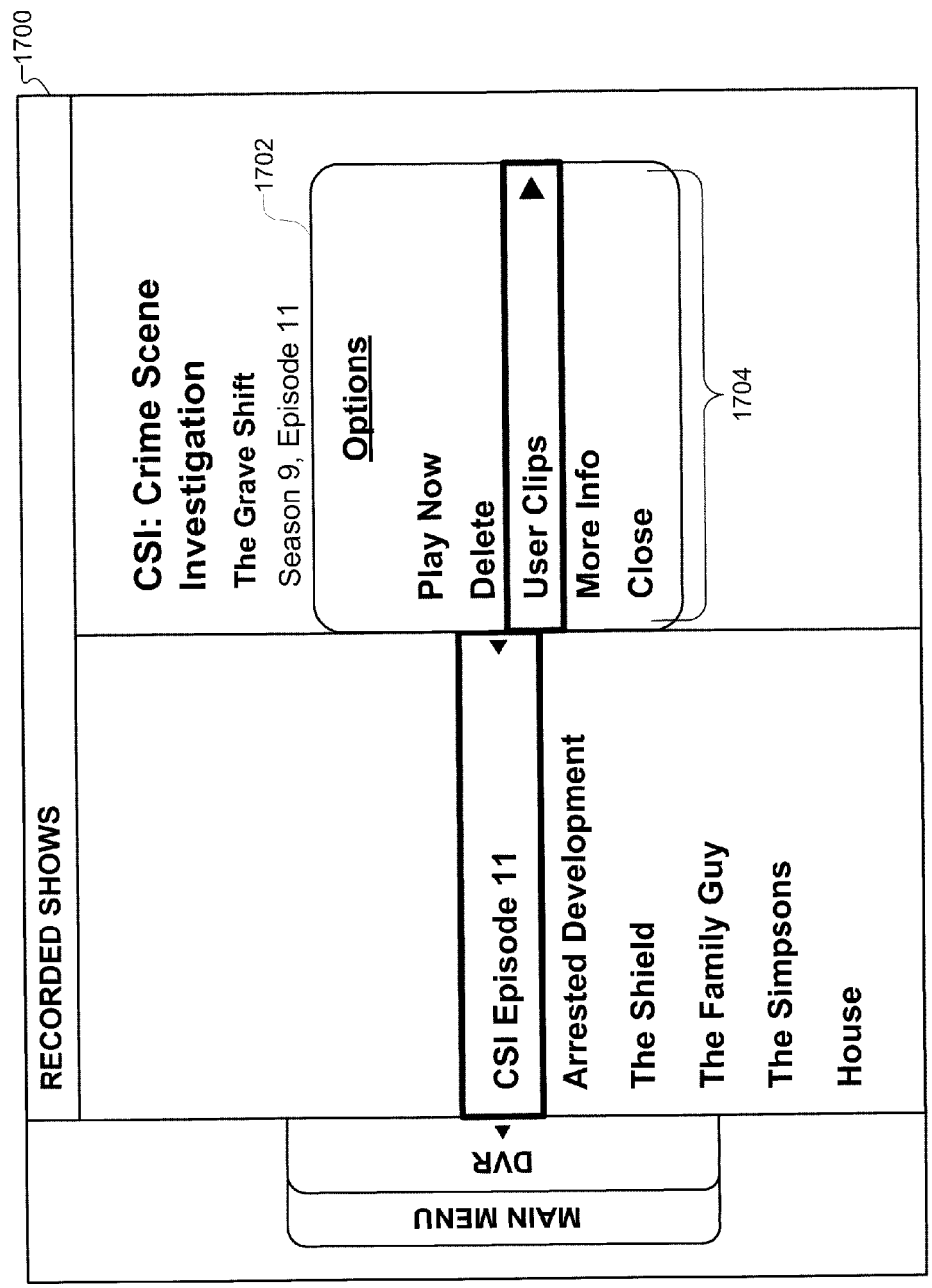
FIGS. 17-19 illustrate exemplary graphical user interfaces providing at least one tool configured to facilitate utilization of a user-defined segment of a recorded media content program.

FIG. 17 illustrates a GUI 1700 having an exemplary media content program options view 1702 displayed therein. As shown in FIG. 17, program options view 1702 may include a plurality of options 1704 associated with a selected media content program (the media content program known as "CSI Episode 11"). In the illustrated example, the plurality of options 1704 includes a "play now" option, a "delete" option, a "user clips" option, a "more info" option, and a "close" option. In response to a user selection of the "user clips" option shown in FIG. 17, a user clips view may be provided for display.

Figure 18:
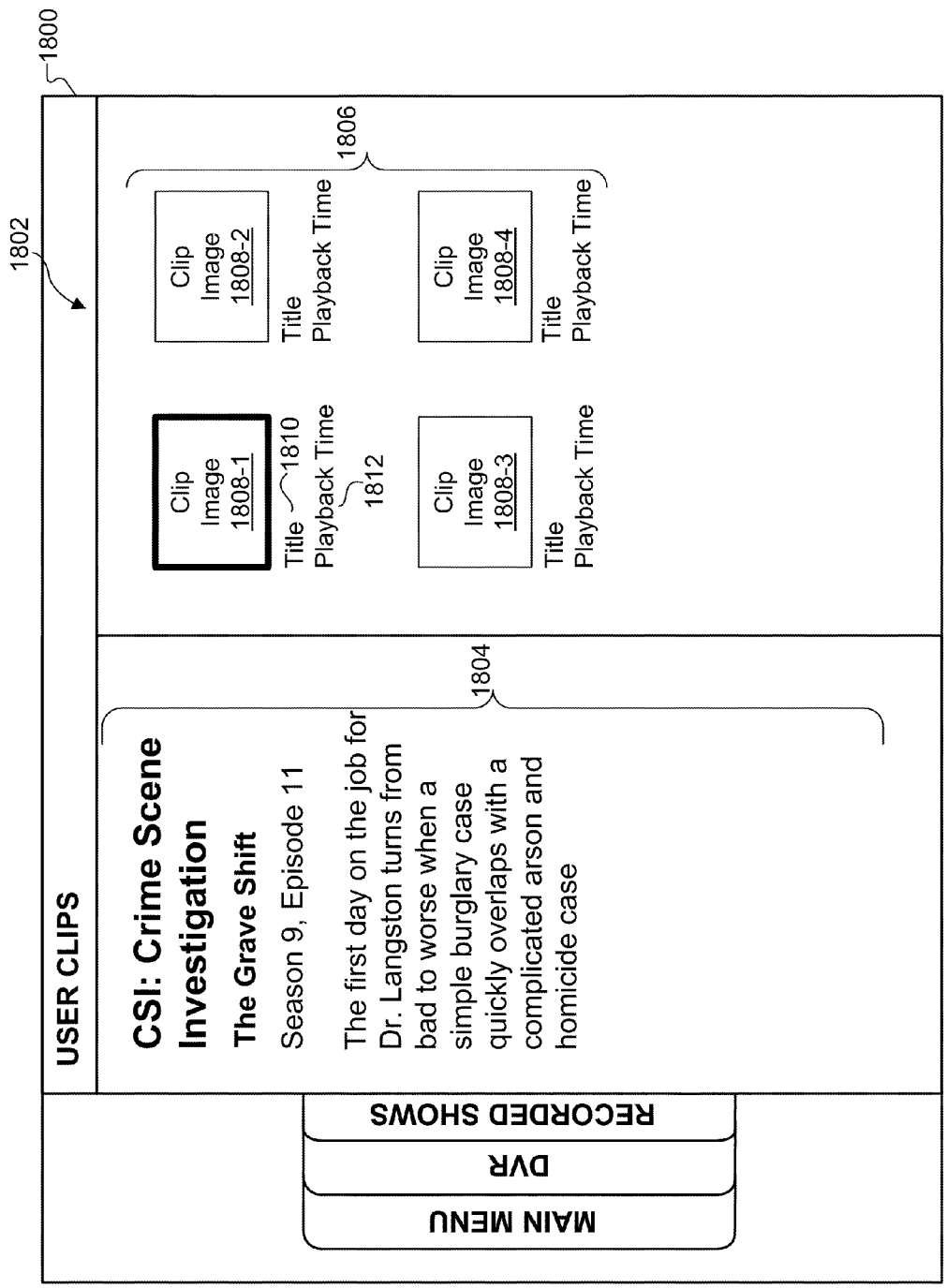
Figure 19:
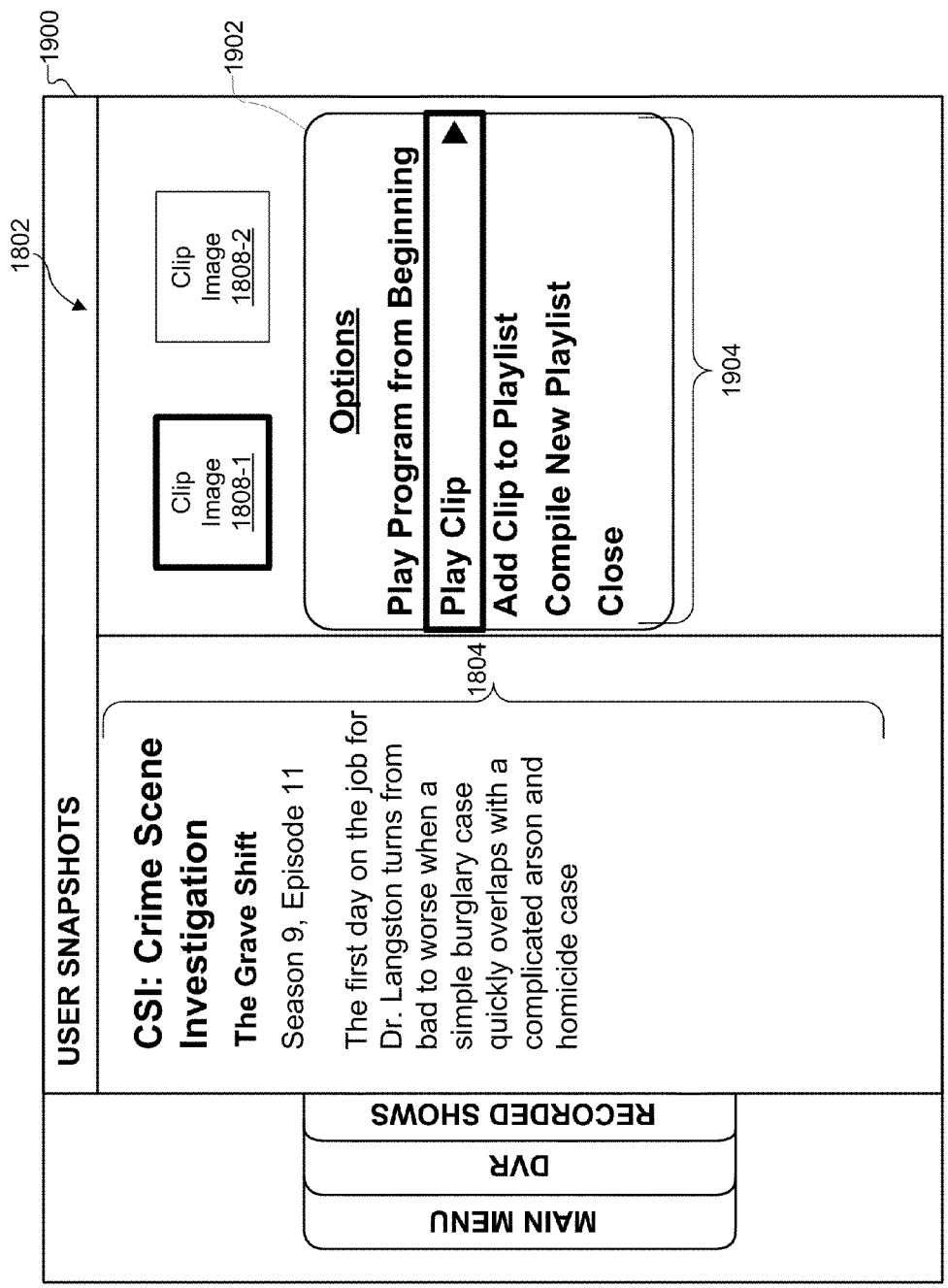

For example, FIG. 18 illustrates a GUI 1800 having an exemplary user clips view 1802 displayed therein. As shown in FIG. 18, user clips view 1802 may include information 1804 about a selected media content program (e.g., a media content program known as "CSI Episode 11"). In addition, user clips view 1802 may include graphical data 1806 representative of one or more user-defined segments of the selected media content program. In the example illustrated in FIG. 18, graphical data 1806 includes a plurality of clip images 1808 (e.g., clip images 1808-1 through 1808-4) corresponding to and representative of user-defined segments of the selected media content program. The clip images 1808 may include frame images included in the user-defined segments of the media content program.

User clips view 1802 may also include graphical data representative of information associated with clip images 1808. For example, user clips view 1802 may include graphical data representative of titles of the user-defined segments associated with clip images 1808. User clips view 1802 may also include graphical data representative of playback times (e.g., durations) associated with clip images 1808. As an example, a title 1810 and a playback time 1812 corresponding to clip image 1808-1 are displayed in GUI 1800 along with clip image 1808-1.

Returning now to FIG. 16, in step 1604, a user selection of a user-defined segment is detected. The selection may be detected in any suitable way. For example, a user may utilize one or more tools included in GUI 1800 of FIG. 18 to select clip image 1808-1. The user selection of clip image 1808-1 may be detected and identified as a user selection of the user-defined segment associated with the clip image 1808-1.

In step 1606, a plurality of menu options associated with the selected user-defined segment of the media content program is provided. The menu options may be provided in response to the user selection detected in step 1604. As an example, FIG. 19 illustrates a GUI 1900 having an exemplary segment options view 1902 displayed therein. As shown in FIG. 19, segment options view 1902 may include a plurality of selectable options 1904 display therein. In the example illustrated in FIG. 19, the options 1904 include a "play program from beginning" option, a "play clip" option, an "add clip to playlist" option, a "compile new playlist" option, and a "close" option.

Returning again to FIG. 16, in step 1608, a request to play the user-defined segment of the recorded media content program is detected. For example, a user may select the "play clip" option from the plurality of selectable options in segment options view 1902. This user selection may be detected in any suitable way.

In step 1610, indexing data for the selected user-defined segment of the recorded media content program is utilized to access and play back the user-defined segment for experiencing by a user. Step 1610 may be performed in any of the ways described above for playing back a segment of a recorded media content program. In certain embodiments, once the user-defined segment has been played back, a prompt to select whether to play a next user-defined segment in a list of user-defined segments of the recorded media content program may be provided in a user interface. In the above-described or similar manner, an end user may define and subsequently access and watch one or more custom-defined segments of a recorded media content program.

In certain embodiments, at least one tool may be provided that is configured to facilitate a user-definition of a set of one or more user-defined segments of a recorded media content program. For example, one or more tools may be provided that facilitate user creation of a playlist set of one or more user-defined segments of a recorded media content program. To illustrate, segment options view 1902 in GUI 1900 of FIG. 19 includes one or more options configured to facilitate user-definition of a playlist of one or more user-defined segments (i.e., clips) of a recorded media content program. In particular, an "add clip to playlist" option may allow a user to add a selected user clip of a media content program to a playlist. Accordingly, the user may build a playlist of user clips by adding one or more clips to the playlist. In certain examples, one or more tools may be provided that allow the user to manage the playlist, including reordering segments within, deleting segments from, and adding segments to the playlist.

A user may be able to define one or more playlists of user-defined segments of a media content program. For example, segment options view 1902 of FIG. 19 may further include a "compile new playlist" option that may be selected by an end user to initiate creation of a new playlist.

A user-defined playlist of one or more user-defined segments of a recorded media content program may function as a set of one or more select segments representing one or more select highlights of the recorded media content program, as described above. For example, in response to a user definition of a playlist of user-defined segments of a recorded media content program, program highlights data specifying a set of the user-defined segments of the recorded media content program may be created based on the user definition of the playlist. The program highlights data may include and/or be represented by any of the data described above, including indexing data that may be used to index the recorded media content program. Hence, a set of one or more select segments of a recorded media content program may be defined by an end user.

Figure 20:
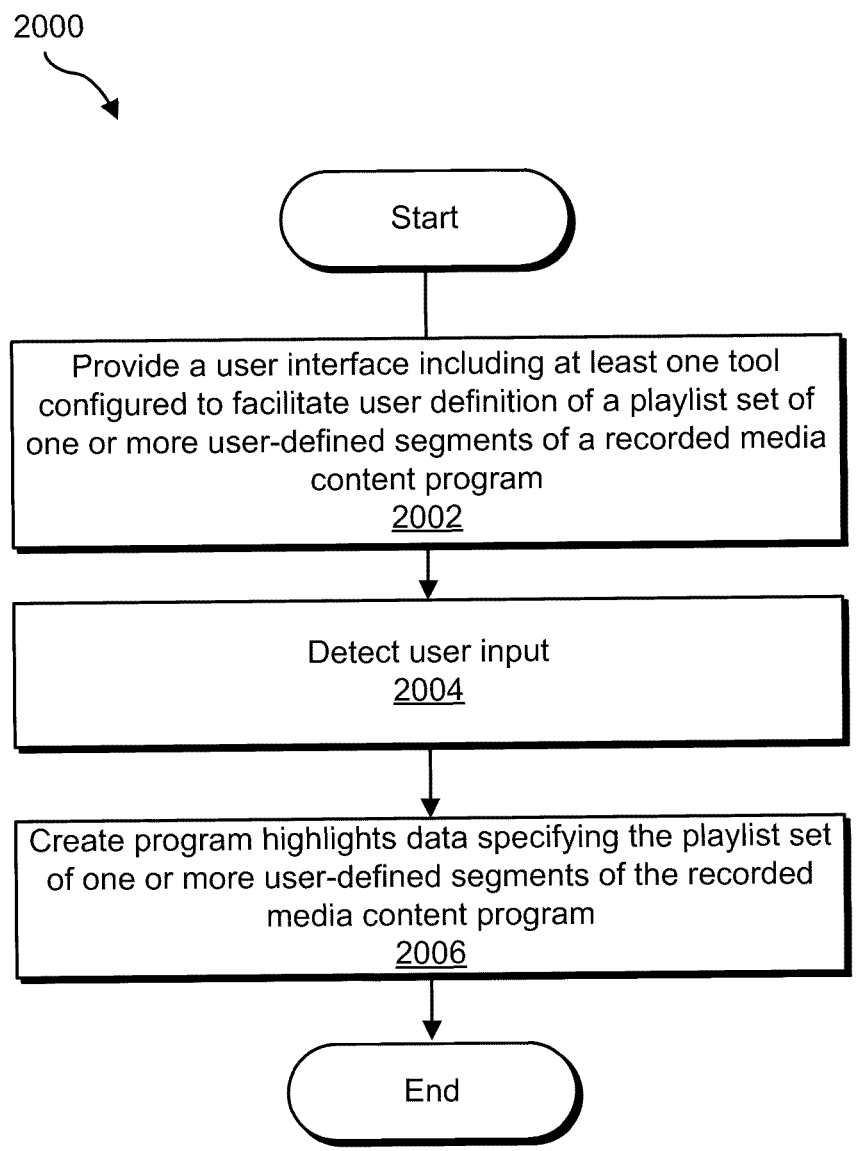
FIG. 20 illustrates an exemplary method of facilitating a user-definition of a playlist set of one or more user-defined segments of a recorded media content program.

FIG. 20 illustrates an exemplary method 2000 of facilitating a user-definition of a playlist set of one or more user-defined segments of a recorded media content program. While FIG. 20 illustrates exemplary steps according to one embodiment, other embodiments may omit, add to, reorder, and/or modify any of the steps shown in FIG. 20. One or more of the steps shown in FIG. 20 may be performed by system 100, provider subsystem 202, access subsystem 204, and/or device 300.

In step 2002, a user interface including at least one tool configured to facilitate a user definition of a playlist set of one or more user-defined segments of a recorded media content program is provided. For example, one or more GUIs may be provided that include one or more tools configured to facilitate a user definition of a playlist set of one or more user-defined segments of the recorded media content program. FIG. 19 provides just one example of exemplary GUI tool options configured to facilitate a user definition of a playlist set of select segments of a recorded media content program. It will be understood that any suitable GUI tool may be provided and utilized by a user to define a playlist set of select segments of the recorded media content program.

In step 2004, user input is detected. For example, a user may provide user input through a GUI such as GUI 1900 to define a playlist set of one or more user-defined segments of the recorded media content program. Such user input may be detected in any suitable way.

In step 2006, program highlights data specifying the playlist set of one or more user-defined segments of the recorded media content program is created. The program highlights data may include and/or be represented by any of the data described above, including indexing data that may be used to index the recorded media content program.

While the above examples are directed to a user defining a custom playlist set of user-defined segments of a recorded media content program, a playlist may include user-defined segments from multiple different recorded media content programs. In addition, a user-defined playlist is not limited to including only user-defined segments of a recorded media content program. Segments defined by other sources, such as a producer of the recorded media content program, a distributor of the recorded media content program, or a third-party providing a program highlights servicer, may also be included by an end-user-defined playlist of clips.

In certain embodiments, one or more tools configured to facilitate publishing of user-defined playlists of segments of a recorded media content program and/or user-defined segments of a recorded media content program may be provided. Accordingly, a user may share a user-defined segment and/or a playlist of one or more segments with other users (e.g., other subscribers to a service).

Figure 21:
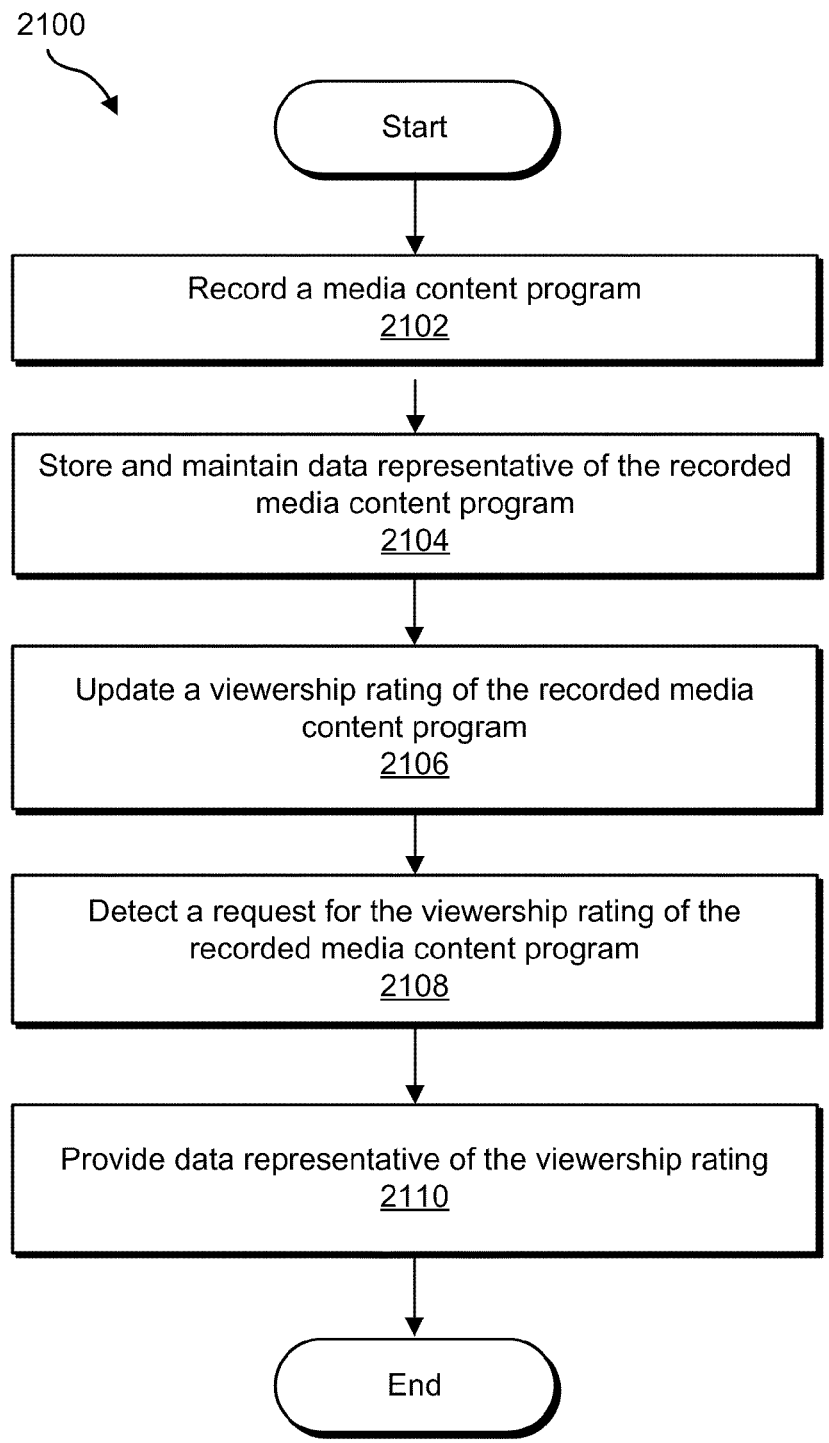
FIG. 21 illustrates an exemplary method of updating and utilizing a viewership rating of a recorded media content program.

In addition or alternative to enhancing utilization of recorded media content in any of the ways described above, utilization of recorded media content may be enhanced by updating viewership ratings associated with the recorded media content. As an example, FIG. 21 illustrates an exemplary method 2100 of updating a viewership rating of a recorded media content program. While FIG. 21 illustrates exemplary steps according to one embodiment, other embodiments may omit, add to, reorder, and/or modify any of the steps shown in FIG. 21. One or more of the steps shown in FIG. 21 may be performed by system 100, provider subsystem 202, access subsystem 204, and/or device 300.

In step 2102, a media content program is recorded. Step 2102 may be performed in any of the ways described above. For example, media content recording facility 104 may record the media content program, such as by recording a live transmission of the media content program.

In step 2104, data representative of the recorded media content program is stored and maintained. Step 2104 may be performed in any of the ways described above. For example, media content recording facility 104 may store data representative of the recorded media content program in data storage facility 112, which may maintain data representative of the recorded media program within recorded media content 114.

As described above, metadata associated with the recorded media content program may also be stored and maintained. In certain embodiments, the metadata associated with the recorded media content program may include a viewership rating field in which a viewership rating or a link to the viewership rating for the recorded media content program may be stored. The viewership rating may be received and stored in conjunction with the recording of the media content program.

In step 2106, a viewership rating of the recorded media content program is updated. This may include requesting and receiving data representative of the viewership rating from a viewership ratings source (e.g., a server device). For example, a media content processing device (e.g., an end-user media content processing device or a network media content processing device) may request and receive a viewership rating for the recorded media content program from an external device such as a server device providing viewership ratings for recorded media content. The server device may be associated with a producer of the media content program, a distributor of the media content program, or a third-party providing media content viewership ratings data.

In certain embodiments, step 2106 may be performed periodically (e.g., nightly) or in response to a predetermined event. For example, on a periodic basis, a media content processing device may request viewership ratings for one or more recorded media content programs. This may include transmitting program identifiers for the recorded media content programs to one or more sources of viewership ratings for the recorded media content programs. As another example, when a predetermined event occurs, such as a user browsing to a menu GUI in which one or more viewership ratings of recorded media content are to be displayed, a media content processing device may request an updated viewership rating for each of one or more recorded media content programs in response to the occurrence of the predetermined event. In some examples, requests for viewership ratings may be piggy-backed on one or more other communications associated with a media content distribution service.

Updated viewership ratings may be received, stored, and maintained in any suitable way. For example, an updated viewership rating may be stored in an appropriate field of metadata associated with the corresponding recorded media content program.

Updated viewership ratings may be utilized as may suit a particular application. To illustrate, in step 2108, a request for the viewership rating of the recorded media content program is detected. For example, when a user of a media content processing device browses to a particular GUI menu including a list of recorded media content programs, a request for the updated viewership rating of each of the recorded media content programs to be included in the list may be automatically generated. Such a request may be detected in any suitable way.

In step 2110, data representative of the viewership rating is provided. For example, data representative of the viewership rating requested in step 2108 may be displayed in the GUI menu in association with data representative of the corresponding recorded media content program. Hence, a user may view an updated viewership rating for the recorded media content program in one or more GUIs.

Updated viewership ratings may help an end user identify media content programs to watch based on up-to-date viewership ratings rather than outdated, static viewership ratings as they existed at recording time. In some implementations, updated viewership ratings may provide more reliable information inasmuch as more and more viewers may provide viewership ratings over time (after transmission and/or recording of a media content program). For at least these reasons, viewership ratings may be dynamically accessed and utilized, such as at runtime of a media content processing device. For instance, at one or more suitable times after a media content program has been recorded and its metadata stored in conjunction with the recording, a viewership ratings data field in the metadata may be dynamically updated with up-do-date viewership ratings that has been dynamically requested and received from another source such as a server device.

Figure 22:
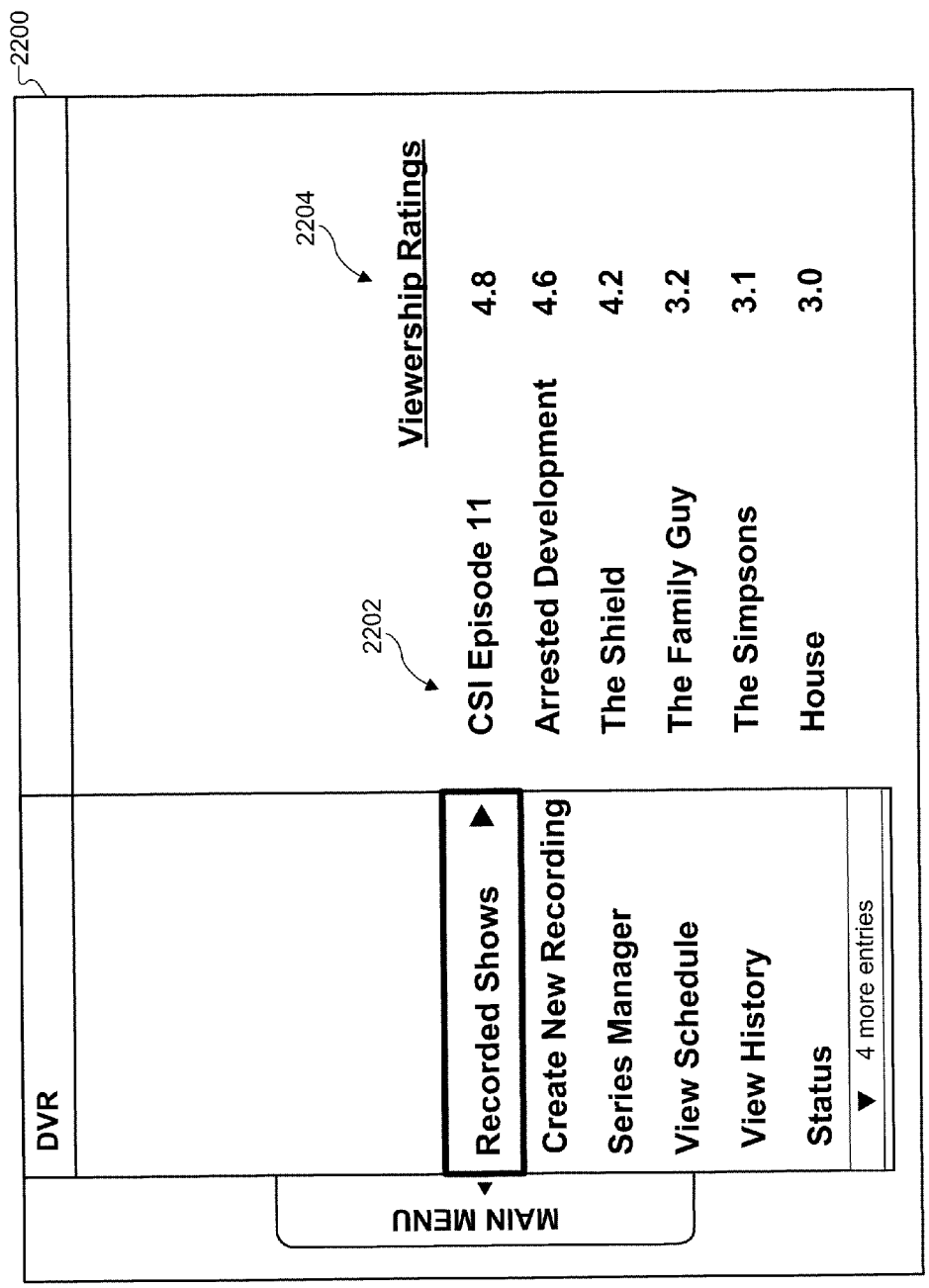
FIG. 22 illustrates an exemplary graphical user interface displaying viewership ratings for recorded media content programs.

FIG. 22 illustrates an exemplary GUI 2200 displaying a list 2202 of recorded media content programs and a list 2204 of their associated viewership ratings. The viewership ratings displayed in GUI 2200 may include updated viewership ratings for the media content programs that have been requested and received as described above subsequent to the recording of the media content programs. In some examples, the recorded media content programs may be sorted by viewership ratings in GUI 2200.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
maintaining, by a media content processing system, data representative of a recorded media content program in a data storage facility;
accessing, by the media content processing system, program highlights data for the recorded media content program, the program highlights data specifying a set of one or more select segments of the recorded media content program,
wherein the set of one or more select segments of the recorded media content program is defined by a first user of an end-user media content processing device and represented in a table of index data, the table of index data including a start index value defined by the first user for each of the one or more select segments of the recorded media content program and a duration index value for each of the one or more select segments of the recorded media content program; and
utilizing, by the media content processing system, the program highlights data to access and play back the set of one or more select segments of the recorded media content program represented in the table of index data for experiencing by an end user;
wherein the end user has control of selection and playback of the set of one or more select segments of the recorded media content program.

2. The method of claim 1, further comprising:
recording, by the media content processing system, a live transmission of a media content program; and
storing, by the media content processing system, the recorded live transmission of the media content program as the recorded media content program in the data storage facility.

3. The method of claim 1, wherein:
the utilizing of the program highlights data to access and play back the one or more select segments of the recorded media content program includes utilizing the table of indexing data to index to the start index value for each of the one or more select segments of the recorded media content program to access and play back the one or more select segments of the recorded media content program.

4. The method of claim 3, wherein the indexing data includes a global start time for the recorded media content program and one or more offsets from the global start time, wherein the one or more offsets represent one or more start index values of the one or more select segments specified in the program highlights data.

5. The method of claim 3, wherein the utilizing of the table of indexing data to index to the start index value for each of the one or more select segments of the recorded media content program to access and play back the one or more select segments of the recorded media content program avoids creating a copy of the one or more select segments of the recorded media content program.

6. The method of claim 1, wherein:
the program highlights data is included in metadata associated with the recorded media content program; and
the accessing of the program highlights data comprises retrieving the program highlights data from the metadata associated with the recorded media content program.

7. The method of claim 1, wherein the accessing of the program highlights data comprises dynamically requesting and receiving the program highlights data from a server device and inserting the received program highlights data into metadata associated with the recorded media content program.

8. The method of claim 1, wherein the media content processing system comprises an end-user media content processing device that performs at least
the accessing of the program highlights data for the recorded media content program by requesting and receiving the program highlights data from a device external to the end-user media content processing device, and
the utilizing of the program highlights data to access and play back the set of one or more select segments of the recorded media content program by indexing the recorded media content program in the data storage facility.

9. The method of claim 1, wherein the media content processing system comprises a network device providing a network-based media content recording service to an end-user media content processing device, the network device performing at least
the accessing of the program highlights data for the recorded media content program by requesting and receiving the program highlights data from a device external to the network device, and
the utilizing of the program highlights data to access and play back the set of one or more select segments of the recorded media content program by indexing the recorded media content program in the data storage facility and streaming data representative of the set of one or more select segments of the recorded media content program to the end-user media content processing device.

10. The method of claim 1, further comprising:
providing, by the media content processing system, a graphical user interface for display, the graphical user interface including at least one tool configured to facilitate a user definition of the set of one or more select segments of the recorded media content program;
detecting, by the media content processing system, user input received through the graphical user interface; and creating, by the media content processing system, the program highlights data specifying the set of one or more select segments of the recorded media content program based on the user input.

11. The method of claim 1, further comprising:
maintaining, by the media content processing system, a viewership rating for the recorded media content program;
updating, by the media content processing system, the viewership rating for the recorded media content program, the updating comprising requesting and receiving the viewership rating from a server device and inserting the viewership rating in metadata associated with the recorded media content program.

12. The method of claim 11, wherein the updating is performed at least one of periodically and in response to an occurrence of a predetermined event.

13. The method of claim 1, wherein:
the recorded media content program comprises a recorded sporting event; and
the set of one or more select segments of the recorded media content program represent one or more highlights in the sporting event.

14. The method of claim 1, tangibly embodied as computer-executable instructions on at least one computer-readable medium.

15. The method of claim 1, wherein the set of one or more select segments further includes data, provided by the first user, representative of a title for at least one of the one or more select segments.

16. The method of claim 1, wherein the start index value corresponds to one second of playback time of the recorded media content program.

17. The method of claim 1, wherein the duration index value for each of the one or more select segments of the recorded media content program represents, within the program highlights data, a duration for each of the one or more select segments of the recorded media content program.

18. The method of claim 1, further comprising providing, by the media content processing system, an end user interface accessible by the end user through an end user media content processing device, the end user interface comprising a menu option, selectable by the end user, to access and play back highlights of the recorded media program.

19. A method comprising:
recording, by a media content processing system, a live transmission of a media content program;
maintaining, by the media content processing system, data representative of the recorded media content program in a data storage facility;
providing, by the media content processing system, a user interface including at least one tool configured to facilitate a user definition of a segment of the recorded media content program;
detecting, by the media content processing system, the definition of the segment of the recorded media content program;
generating, by the media content processing system, a table of index data, the table of index data including a start index value defined by a first user for the segment of the recorded media content program and a duration index value for the segment of the recorded media content program; and
providing, by the media content processing system, the segment of the recorded media content program for experiencing by an end user.

20. The method of claim 19, further comprising:
detecting, by the media content processing system, a request from the end user to play back the segment of the recorded media content program; and
utilizing, by the media content processing system, the table of index data to access and play back the segment of the recorded media content program.

21. The method of claim 19, further comprising:
providing, by the media content processing system, another user interface including at least one tool configured to facilitate a user definition of a playlist set of one or more user-defined segments of the recorded media content program, the playlist set of one or more user defined segments of the recorded media content program including the segment of the recorded media content program for experiencing by the end user;
detecting, by the media content processing system, user input received through the another user interface; and
creating, by the media content processing system and based on the user input, program highlights data specifying the playlist set of one or more user-defined segments of the recorded media content program, the playlist set of one or more user-defined segments of the recorded media content program representing a set of one or more user-defined highlights in the recorded media content program.

22. A system comprising:
a data storage facility configured to maintain data representative of a recorded media content program and a table of index data for the recorded media content program;
a recorded media content enhancement facility configured to access program highlights data for the recorded media content program, the program highlights data specifying a set of one or more select segments of the recorded media content program defined by a user and represented in the table of index data, the table of index data including a start index value defined by the user for each of the one or more select segments of the recorded media content program and a duration index value for each of the one or more select segments of the recorded media content program; and
a media content presentation facility configured to utilize the program highlights data to access and play back the set of one or more select segments of the recorded media content program represented in the table of index data, the set of one or more select segments of the recorded media content program representing a set of one or more highlights in the recorded media content program.

23. The system of claim 22, further comprising:
a media content recording facility configured to record a live transmission of a media content program and store the recorded live transmission of the media content program as the recorded media content program in the data storage facility.

24. The system of claim 22, further comprising:
a user interface facility configured to provide a graphical user interface for display, the graphical user interface including at least one tool configured to facilitate the user definition of the set of one or more select segments of the recorded media content program;
wherein the recorded media content enhancement facility is further configured to create the program highlights data specifying the set of one or more select segments of the recorded media content program based on the user input.

25. The system of claim 22, wherein:

the data storage facility is further configured to maintain a viewership rating for the recorded media content program; and the recorded media content enhancement facility is further configured to update the viewership rating for the recorded media content program by periodically requesting and receiving the viewership rating from a server device over a network and inserting the viewership rating in metadata associated with the recorded media content program.

* * * * *